United States Patent
Hirota et al.

(10) Patent No.: US 6,627,073 B2
(45) Date of Patent: Sep. 30, 2003

(54) WATER TREATMENT DEVICE

(75) Inventors: Tatsuya Hirota, Kyoto (JP); Yoshihiro Inamoto, Otsu (JP); Kiyokazu Fujikawa, Shiga (JP); Yozo Kawamura, Shiga (JP); Minoru Nakanishi, Otsu (JP); Minoru Kishi, Kusatsu (JP); Takaaki Yonezawa, Kusatsu (JP); Tamotsu Kawamura, Yokaichi (JP); Kazuhiro Yamamoto, Kasai (JP); Yasuhiko Shimizu, Ora-machi (JP); Yasuhito Kondo, Oizumi-machi (JP)

(73) Assignee: Sanyo Electric Co, Ltd., Osaka (JP)

( * ) Notice: Subject to any disclaimer, the term of this patent is extended or adjusted under 35 U.S.C. 154(b) by 226 days.

(21) Appl. No.: 09/734,612

(22) Filed: Dec. 13, 2000

(65) Prior Publication Data

US 2001/0010296 A1 Aug. 2, 2001

(30) Foreign Application Priority Data

| Dec. 16, 1999 | (JP) | ............................................ 11-357937 |
| Dec. 16, 1999 | (JP) | ............................................ 11-357938 |
| Dec. 17, 1999 | (JP) | ............................................ 11-359355 |
| Feb. 8, 2000 | (JP) | .......................................... 2000-30901 |
| Apr. 3, 2000 | (JP) | ........................................ 2000-101128 |

(51) Int. Cl.⁷ .............................. C02F 1/46; C02F 1/76; C02F 1/467; C25B 1/00; C25B 1/04
(52) U.S. Cl. ..................... 210/169; 210/198.1; 210/205; 210/206; 210/416.2; 210/754; 204/237; 204/238; 204/240; 204/275.1; 204/276
(58) Field of Search .............................. 210/169, 198.1, 210/416.2, 205, 206, 754; 204/237, 238, 240, 275.1, 276

(56) References Cited

U.S. PATENT DOCUMENTS

| 3,351,542 A | * | 11/1967 | Oldershaw et al. |
| 3,669,857 A | * | 6/1972 | Kirkham et al. |
| 4,129,493 A | | 12/1978 | Tighe et al. |
| 4,229,272 A | * | 10/1980 | Yates |
| 4,381,240 A | * | 4/1983 | Russell |
| 5,958,229 A | | 9/1999 | Filiopoulos et al. |

FOREIGN PATENT DOCUMENTS

| EP | 0 343 092 A | 11/1989 |
| EP | 0 538 474 A | 4/1993 |
| GB | 1 426 017 A | 2/1976 |
| JP | 02-1493995 | 6/1990 |
| JP | 2-108794 | 8/1990 |
| JP | 03-000192 | 1/1991 |
| JP | 05-115870 | 5/1993 |
| JP | 05-115878 | 5/1993 |
| JP | 06-015276 | 1/1994 |
| JP | 07-108273 | 4/1995 |
| JP | 07-299463 | 11/1995 |
| JP | 07-308354 | 11/1995 |
| JP | 08-039071 | 2/1996 |
| JP | 08-281270 | 10/1996 |
| JP | 09-056614 | 3/1997 |
| JP | 09-057270 | 3/1997 |
| JP | 09-157900 | 6/1997 |
| JP | 09-308885 | 12/1997 |
| JP | 09-323008 | 12/1997 |
| JP | 09-327407 | 12/1997 |

(List continued on next page.)

Primary Examiner—Thomas M. Lithgow
(74) Attorney, Agent, or Firm—Rabin & Berdo, P.C.

(57) ABSTRACT

The present invention is directed to a new water treatment device comprising an electrolytic tank to put water in, an electrode provided in the electrolytic tank, a water treating path for pouring, from a pool storing water, the water into the electrolytic tank and returning to the pool the water in the electrolytic tank, a residual chlorine sensor for measuring the residual chlorine concentration of the water, and a circulating pump provided on the downstream side of the electrolytic tank on the water treating path in order to circulate the water, and capable of simply and efficiently sterilizing water stored in pools of various sizes from a swimming pool to a home bathtub.

6 Claims, 29 Drawing Sheets

FOREIGN PATENT DOCUMENTS

| | | |
|---|---|---|
| JP | 10-227524 | 8/1998 |
| JP | 10-272472 | 10/1998 |
| JP | 10-314748 | 12/1998 |
| JP | 11-033532 | 2/1999 |
| JP | 11-104645 | 4/1999 |
| JP | 11-114001 | 4/1999 |
| JP | 11-132560 | 5/1999 |
| JP | 11-179364 | 7/1999 |
| JP | 11-207353 | 8/1999 |
| JP | 11-319832 | 11/1999 |
| JP | 2000-093971 | 4/2000 |
| WO | WO 95 06506 A | 3/1995 |

* cited by examiner

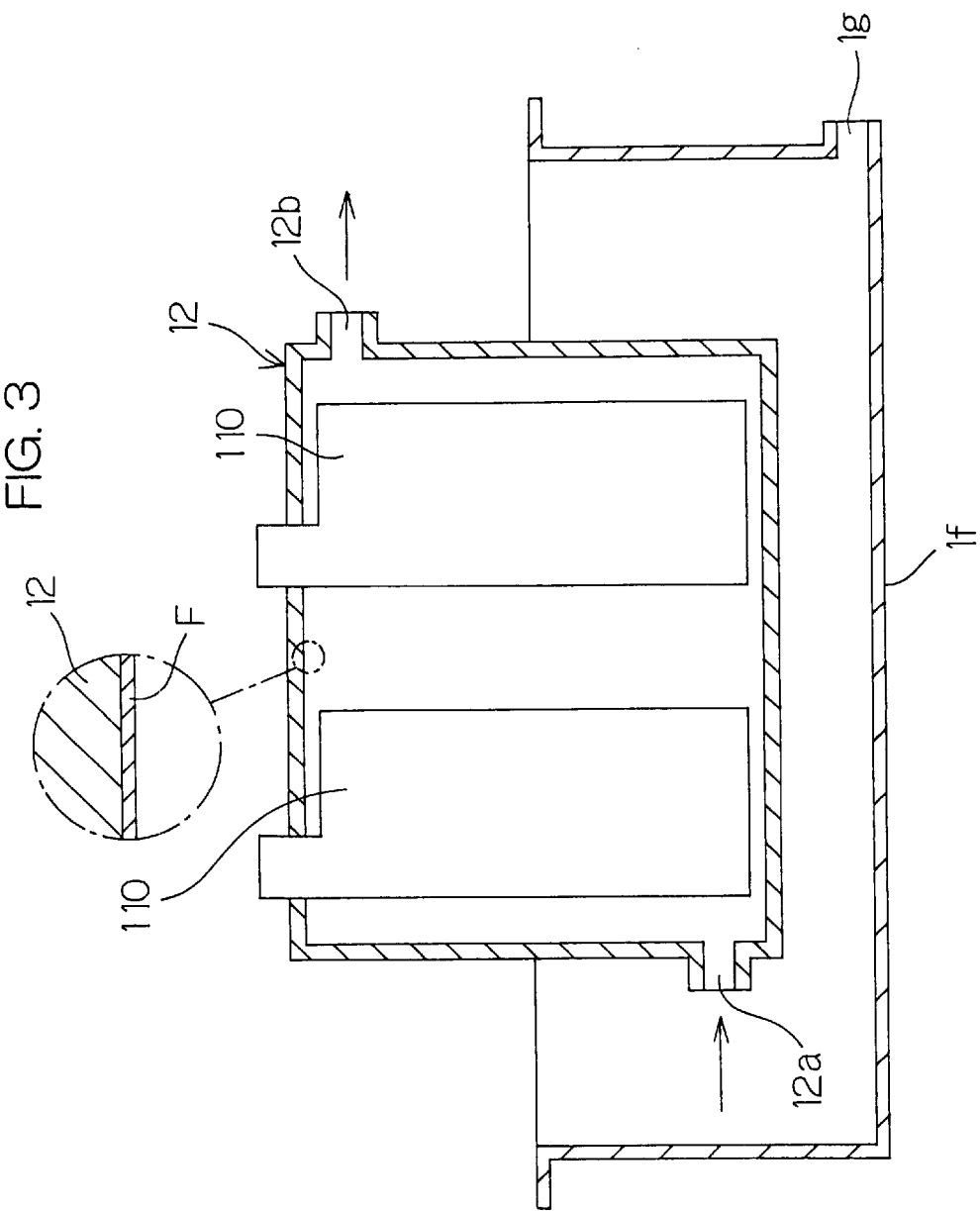

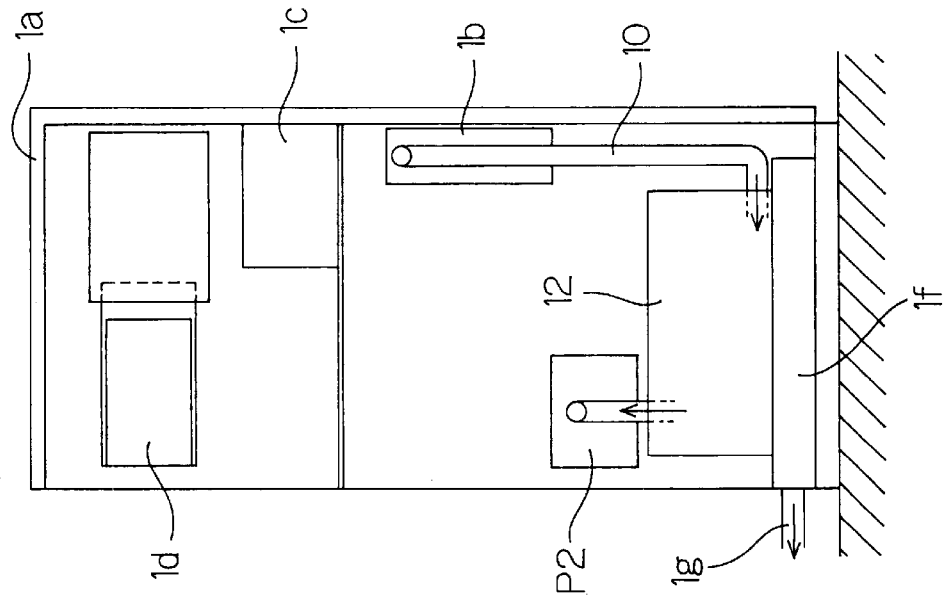
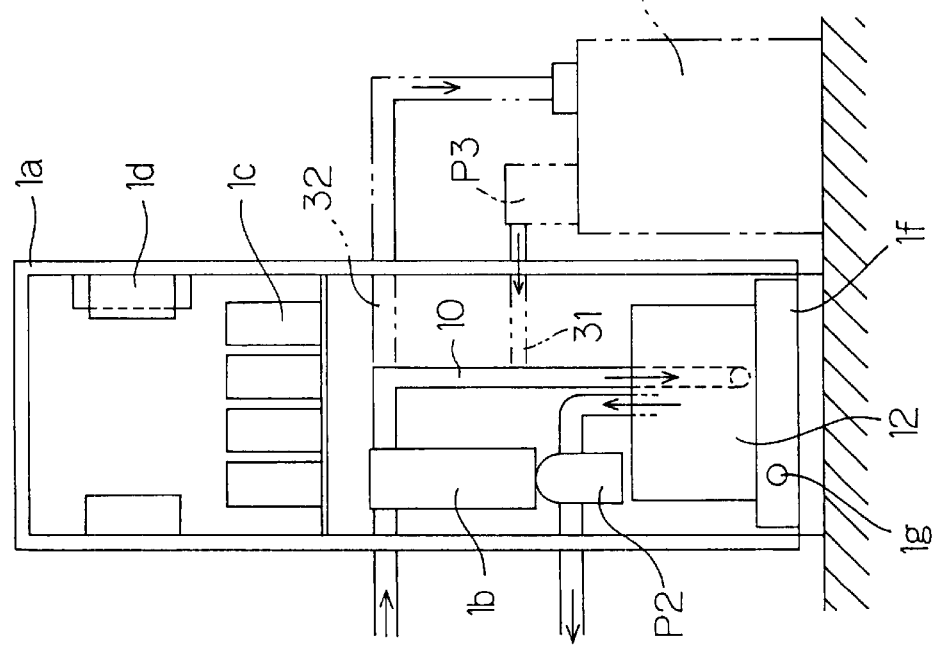

WATER TREATMENT DEVICE

BACKGROUND OF THE INVENTION

The present invention relates to a new water treatment device capable of sterilizing water stored in various types of pools from large-sized pools such as a swimming pool and a bathtub of a public bath to small-sized pools such as a water supply tank disposed on the roof of a building or the like and a home bathtub.

The swimming pool which is installed indoors or outdoors, or the bathtub of the public bath, for example, must be subjected to sterilization by periodically introducing chlorinated lime, sodium hypochlorite (NaClO), or the like into the water in order to maintain the quality of the water.

However, it has been conventionally necessary for employees in facilities, for example, to perform the work by hand outside the business hours (early in the morning, at midnight, etc.), and moreover, the operation had to be done with great caution since the chlorinated lime or sodium hypochlorite are irritant.

Chlorinated lime is generally in the shape of powder or a shape of a tablet obtained by solidifying the powder. Accordingly, it takes a long time until the chlorinated lime is dissolved to make the concentration thereof uniform after it is introduced into the pool. During the time, the pool cannot be used.

In the case of the water supply tank disposed on the roof of the building or the home bathtub, it depends on only a sterilizing force of chlorine contained in tap water under the present condition. Particularly in the case of the water supply tank, algae and so forth reproduce inside thereof, resulting in degraded water quality.

In the case of the home water bath, the water is generally exchanged every one or two days, so that it tends to be considered that there is no problem in terms of the water quality. However, the inside of a boiler connected to the bathtub cannot be frequently cleaned. Therefore, various types of germs, mold, and so forth are liable to reproduce. Accordingly, it is feared that the water quality is degraded.

When the water stored in each of the above-mentioned pools is sterilized, it is necessary for the water not to leak.

SUMMARY OF THE INVENTION

An object of the present invention is to provide a new water treatment device capable of simply and efficiently sterilizing water stored in various types of pools without causing the water to leak.

The invention as set forth in the claim 1 is directed to a water treatment device comprising electrolyzing and sterilizing means, comprising an electrolytic tank to put water in and an electrode for electrolysis provided in the electrolytic tank, for pouring water into the electrolytic tank, energizing the electrode, and electrolyzing the water, to sterilize the water; a water treating path connected to a pool storing water for pouring the water in the pool into the electrolytic tank and returning to the pool the water in the electrolytic tank; and a circulating pump provided on the downstream side of the electrolytic tank on the water treating path in order to circulate the water.

In the construction as set forth in the claim 1, the electrode arranged in the electrolytic tank is energized in a state where an electrolyte containing chlorine such as sodium chloride (NaCl), calcium chloride ($CaCl_2$), or hydrochloric acid (HCl) is added to the water which has been poured into the electrolytic tank through the water treating path from the pool or a state where no electrolyte is added when the water previously contains an electrolyte for sterilization.

Consequently, the water is sterilized by a chlorine compound such as hypochlorous acid (HClO), its ion (ClO$^-$), or chlorine gas ($Cl_2$) which is generated by electrolytic reaction, described below, active oxygen ($O_2^-$) generated for a very short time in the reaction process, or the like, and is then returned to the pool through the water treating path.

(Anode)

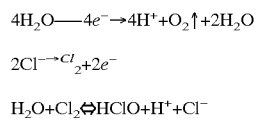

$2Cl^- \xrightarrow{Cl_2} +2e^-$

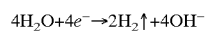

(Cathode)

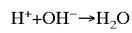

(Anode+Cathode)

$H^+ + OH^- \rightarrow H_2O$

The above-mentioned series of operations is performed only by a worker, for example, manually operating a pump for circulating the water through the water treating path and energizing the electrode without almost passing through human hands or without the worker directly touching the water. If the operation of the pump, or the energization of the electrode, or the like is automated utilizing a timer or a residual chlorine sensor, the water treatment can be completely automated.

Therefore, in the construction as set forth in the claim 1, the water stored in the pool can be simply and efficiently sterilized.

Moreover, the water returned to the pool upon being sterilized by the water treatment device contains only ions having a significantly low concentration. Accordingly, the above-mentioned treatment can be performed periodically even during the business hours of the swimming pool, the public bath, or the like or arbitrarily in accordance with the quality of the water which varies depending on the number of visitors, the weather, the temperature, or the like.

In the swimming pool, the public bath, or the like, therefore, work for introducing chlorinated lime, sodium hypochlorite, or the like to sterilize the water can be entirely omitted, or the number of times of the work can be significantly reduced. Accordingly, the water quality can be kept good while significantly easing the burden on the worker.

In the water supply tank disposed on the roof of the building, or the like, the series of work is manually or automatically performed for each predetermined volume of used water, for example, or for each predetermined time period irrespective of the volume of used water, it is possible to prevent the water quality from being degraded by restraining the reproduction of algae, or the like.

Furthermore, in the home bath or the like, the series of work is manually or automatically performed, for example, at the time point where daily bathing is terminated, and prior to draining bath water, it is possible to prevent the water quality from being degraded by restraining the reproduction of germs, mold, or the like in a boiler connected to the bathtub.

In the construction as set forth in the claim 1, the water pressure in the electrolytic tank can be reduced by the water sucking function of the circulating pump arranged on the downstream side of the electrolytic tank on the water treatment path. Therefore, the water treatment device can be constructed as a water treatment device in which water does not easily leak by improving water tightness in portions such as a portion from which wiring for energizing the electrode is pulled out of the electrolytic tank. Further, a sealing structure of the portion from which the wiring is pulled out can be also simplified.

The invention as set forth in the claim 2 is the water treatment device as set forth in the claim 1, further comprising a solution tank to put in an electrolytic solution containing a chlorine ion, and a supplying path for supplying the electrolytic solution to the electrolytic tank from the solution tank.

In the construction as set forth in the claim 2, the chlorine ion concentration of the water in the electrolytic tank can be adjusted by supplying the electrolytic solution to the water in the electrolytic tank from the solution tank such that it is not lowered. Therefore, the water can be efficiently sterilized by improving the efficiency of the electrolytic reaction in the electrolytic and sterilizing means.

The invention as set forth in the claim 3 is the water treatment device as set forth in the claim 2, further comprising an introducing path branched from the water treating path for pouring water into the solution tank.

In the construction as set forth in the claim 3, a solid electrolyte such as sodium chloride in a large amount, corresponding to several to several ten times of supply, is previously supplied to the solution tank, thereby making it possible to save time and labor taken to supply the electrolyte. That is, when water corresponding to one time of supply is poured into the solution tank through the introducing path, the solid electrolyte in an amount corresponding to the amount of the water, that is, enough to be saturated is dissolved in the water, but is not further dissolved after it is saturated, to remain as a solid content. Accordingly, the electrolyte corresponding to several to several ten times of supply can be previously supplied to the solution tank, thereby making it possible to reduce the number of times of supply. Further, the electrolytic solution produced by dissolving the electrolyte does not require an operation for adjusting the amount of the electrolyte to make the concentration thereof constant because the concentration becomes an approximately constant saturation concentration irrespective of a slight difference by the temperature, as described above. Accordingly, it is possible to save time and labor in supplying the electrolyte. Moreover, the water is poured into the solution tank from the introducing path, and the solution in the solution tank is agitated, thereby making it possible to produce the electrolytic solution having a uniform concentration. Accordingly, an agitating device or the like need not be separately provided in the solution tank, thereby making it possible to simplify the device.

The invention as set forth in the claim 4 is the water treatment device as set forth in the claim 3, further comprising a filter provided on the upstream side of a branching point of the introducing path on the water treating path in order to filter water.

In the construction as set forth in the claim 4, clean water from which organic matter has been removed by the filter is supplied to the electrolytic tank. Therefore, the efficiency of the electrolysis is prevented from being reduced by the adhesion of the organic matter on the surface of the electrode, thereby making it possible to efficiently sterilize the water.

The invention as set forth in the claim 5 is the water treatment device as set forth in the claim 1, comprising a sterilizing solution tank to put in a sterilizing solution containing a chlorine ion, and a supplying path for supplying the sterilizing solution from the sterilizing solution tank to a portion on the downstream side of the electrolytic tank of the water treating path.

In the construction as set forth in the claim 5, even when there arises the necessity of sterilizing a large quantity of water as the residual chlorine concentration is rapidly lowered, that is, the water quality is lowered by a rapid increase in the number of visitors to a swimming pool, or the like, and the water cannot be sufficiently sterilized only by the electrolytic reaction in the electrolyzing and sterilizing means, the sterilizing solution is supplied from the sterilizing solution tank, thereby making it possible to efficiently sterilize the water. That is, sterilization conforming to the degree of the reduction in the water quality can be performed by preferably diluting a solution of chlorinated lime, sodium hypochlorite, calcium hypochlorite $[(CaClO)_2]$, or the like and supplying the diluted solution to the water treating path.

When a large quantity of water is sterilized, a large amount of a chlorine compound is required. In order to sterilize the water only by the electrolyzing and sterilizing means, therefore, an amount of current to the electrode must be increased. Consequently, a large-sized electrode (that is, increasing the size of the electrolytic tank) and a large-capacity power supply are required. However, the fabrication cost and the running cost of the device correspondingly rise. Moreover, the water treatment device itself is increased in size, so that it is not suitable for practical applications. Further, even if a voltage applied to the electrode is increased, the sterilization may, in some cases, be still insufficient. Contrary to this, according to the construction as set forth in the claim 8, even when the quantity of water treatment is large, the amount of a required chlorine compound is large, and the sterilization cannot be sufficiently coped with only by the electrolyzing and sterilizing means, the sterilizing solution is separately supplied from the sterilizing solution tank, thereby making it possible to efficiently sterilize the water.

The invention as set forth in the claim 6 is the water treatment device as set forth in the claim 5, further comprising a bypass path branched on the upstream side of the electrolytic tank on the water treating path and merged into the water treating path on the downstream side of the electrolytic tank and on the upstream side of the branching point on the supplying path.

In the construction as set forth in the claim 6, the water can be sterilized by supplying the sterilizing solution to the water while efficiently circulating the water through the bypass path having a low pressure loss in addition to the function as set forth in the claim 5, thereby making it possible to further improve the efficiency of the sterilization.

The invention as set forth in the claim 7 is the water treatment device as set forth in the claim 1, wherein the pool comprises a filter for filtering water, and a main circulating path for supplying to the filter the water in the pool and returning to the pool the water which has passed through the filter, and the water treating path is branched at a first branching point on the main circulating path and is merged into the main circulating path at a second branching point on the downstream side of the first branching point.

The construction as set forth in the claim 7 is mainly applied to a large-sized pool such as a swimming pool or a bathtub of a public bath. In the large-sized swimming pool, a large quantity of water must be always continuously sand filtered. Further, in a heated swimming pool or bathtub, a large quantity of water must be always continuously heated using a heat exchanger or the like in order to keep the water temperature constant. For this purpose, the main circulating path is located. When the water treatment device is incorporated into the main circulating path, in order to treat a large quantity of water at one time, facilities such as the electrode and the electrolytic tank must be increased in size so as to be balanced with the large quantity of water. However, the necessity of performing the sterilization at all times and for a large amount of water, similarly to sand filtering and heating, is eliminated. Therefore, if the water treating path is arranged with the water treating path branched from the main circulating path, as in the claim 7, therefore, the water treating device need not be increased in size. Moreover, the water can be efficiently sterilized.

The invention as set forth in the claim 8 is the water treatment device as set forth in the claim 7, further comprising a sterilizing solution tank to put in a sterilizing solution containing a chlorine ion, and a supplying path for supplying from the sterilizing solution tank the sterilizing solution to a portion, on the downstream side of the second branching point, on the main circulating path.

In the construction as set forth in the claim 8, even when the supply of the water to the water treating path is stopped, it is possible to supply the sterilizing solution to the water via a route other than the water treating path, to sterilize the water.

The invention as set forth in the claim 9 is the water treatment device as set forth in the claim 7, further comprising a heat exchanger provided on the downstream side of the filter on the main circulating path in order to heat water, the second branching point being provided on the downstream side of the heat exchanger on the main circulating path.

In the construction as set forth in the claim 9, the water which has passed through the water treating path is returned to the main circulating path at a position, where the water pressure is lowered by the pressure loss in the heat exchanger, on the downstream side of the heat exchanger arranged on the main circulating path. Even if the pressure loss is increased because the water treating path is somewhat complicated, the water which has passed through the water treating path can be smoothly returned to the main circulating path. Consequently, the capacity of the circulating pump on the water treating path can be miniaturized.

The invention as set forth in the claim 10 is directed to a water treatment device comprising electrolyzing and sterilizing means, comprising an electrolytic tank to put water in and an electrode for electrolysis provided in the electrolytic tank, for pouring water into the electrolytic tank, energizing the electrode, and electrolyzing the water, to sterilize the water; a water treating path connected to a pool storing water for pouring the water in the pool into the electrolytic tank and returning to the pool the water in the electrolytic tank; and a gas separating filter provided on the water treating path in order to separate from the water gas generated by the electrolysis.

In the construction as set forth in the claim 10, fine bubbles by hydrogen gas ($H_2$) and oxygen gas ($O_2$) which are produced as the electrolytic reaction in the electrolytic tank occurs can be separated from the gas separating filter provided on the water treating path on the downstream side of the electrolytic tank. That is, the gas separating filter has the function of passing the water but staying the included fine bubbles without passing them. By the function, many of the fine bubbles which have stayed on the upstream side of the gas separating filter, each of which cannot be so far separated from the water because the diameter thereof is too small, are coupled to one another by storage to increase the diameter of the coupled fine bubbles, thereby producing a buoyant force. Accordingly, the coupled fine bubbles can be easily separated from the water. Therefore, it is possible to prevent the water from being muddy by the fine bubbles and to always return to the pool water which is always clear and is clean to look at.

The construction as set forth in the claim 11 or 12 is preferable as the specific arrangement of the gas separating filter.

The invention as set forth in the claim 11 is the water treatment device as set forth in the claim 10, further comprising a gas/liquid separating tank arranged on the downstream side of the electrolytic tank on the water treating path, the gas separating filter being arranged in the gas/liquid separating tank.

In the construction as set forth in the claim 11, the bubbles whose diameter is increased by the function of the gas separating filter rise to the surface of the water in the gas/liquid separating tank, are moved toward a gas phase on the water surface, and are automatically separated from the water. Therefore, the bubbles can be efficiently removed.

The invention as set forth in the claim 12 is the water treatment device as set forth in the claim 10, wherein the gas separating filter is arranged in the electrolytic tank.

In the construction as set forth in the claim 12, the gas separating filter is arranged in the electrolytic tank, and the electrolytic tank also serves as the gas/liquid separating tank, described above, thereby making it possible to save a space for the device and reduce the cost thereof.

The invention as set forth in the claim 13 is the water treatment device as set forth in the claim 12, wherein the electrolytic tank comprises a blower of a suction type for exhausting the separated gas outward from the electrolytic tank.

In the construction as set forth in the claim 13, gas originated from the fine bubbles which are separated from the water is forcedly exhausted outward from the electrolytic tank by the blower. Accordingly, it is possible to avoid the danger of ignition, explosion, or the like by storage of the gas in the tank. Moreover, the blower is of a suction type, thereby eliminating the possibility of increasing the internal pressure of the electrolytic tank. Accordingly, water leakage due to the rise in the internal pressure does not occur.

The invention as set forth in the claim 14 is the water treatment device as set forth in the claim 12, further comprising a circulating pump provided on the downstream side of the electrolytic tank on the water treatment path in order to suck the water out of the electrolytic tank and circulate the water.

In the construction as set forth in the claim 14, the water pressure in the electrolytic tank can be reduced by the function of sucking out the water using the circulating pump, as in the claim 1. Therefore, the water treatment device can be constructed as a water treatment device in which water does not easily leak by preventing the water from leaking out of a piping connection section.

The invention as set forth in the claim 15 is the water treatment device as set forth in the claim 12, wherein the gas separating filter is formed in a plate shape, the electrolytic tank is divided into three or more areas by providing two or more plate-shaped gas separating filters, and the electrode is arranged in the area, on the uppermost stream side, obtained by the division.

In the construction as set forth in the claim 15, even if the fine bubbles produced by the electrolytic reaction in the electrode arranged in the area on the uppermost stream side pass through the first gas separating filter without being captured, they are captured by the second and the subsequent gas separating filters, thereby making it possible to more reliably separate the fine bubbles from the water.

The invention as set forth in the claim 16 is the water treatment device as set forth in the claim 15, further comprising water level sensing means for sensing the water level in the area on the uppermost stream side in the electrolytic tank, and control means for controlling the pouring of the water into the electrolytic tank on the basis of an output of the water level sensing means.

The water level in each of the areas obtained by dividing the electrolytic tank tends to be higher on the upstream side, while being lower on the downstream side because of the effect of the resistances of the gas separating filters on the flow of water. If the water level in the area on the uppermost stream side in the electrolytic tank is controlled in a predetermined range, as in the claim 16, therefore, it is possible to more reliably prevent the water from leaking from the electrolytic tank.

The invention as set forth in the claim 17 is the water treatment device as set forth in the claim 15, wherein the gas separating filter is detachable from the electrolytic tank.

In the construction as set forth in the claim 17, the gas separating filter is easily maintained in cases such as a case where it is clogged with dust or the like included in the water, and a good state where the gas separating filter is not clogged can be always maintained. Consequently, it is possible to more reliably prevent the possibility that the water level, on the upstream side of the gas separating filter, in the electrolytic tank is too high because the gas separating filter is clogged, causing the water to leak, or the possibility that the water level, on the downstream side of the gas separating filter, of the electrolytic tank is too low, so that air is sucked into the water returned to the pool from the electrolytic tank through the water treating path, making the water in the pool muddy.

BRIEF DESCRIPTION OF THE DRAWINGS

FIG. 3 is a longitudinal sectional view of the electrolytic tank and a pan arranged therebelow;

FIGS. 4(a) and 4(b) are a front view and a side view of a unit in which the water treatment device according to the one embodiment of the present invention is arranged in a cabinet, which illustrates a state where panels on a front surface and a side surface of the cabinet are removed such that the internal structure can be seen;

DESCRIPTION OF PREFERRED EMBODIMENTS

Figure 1:
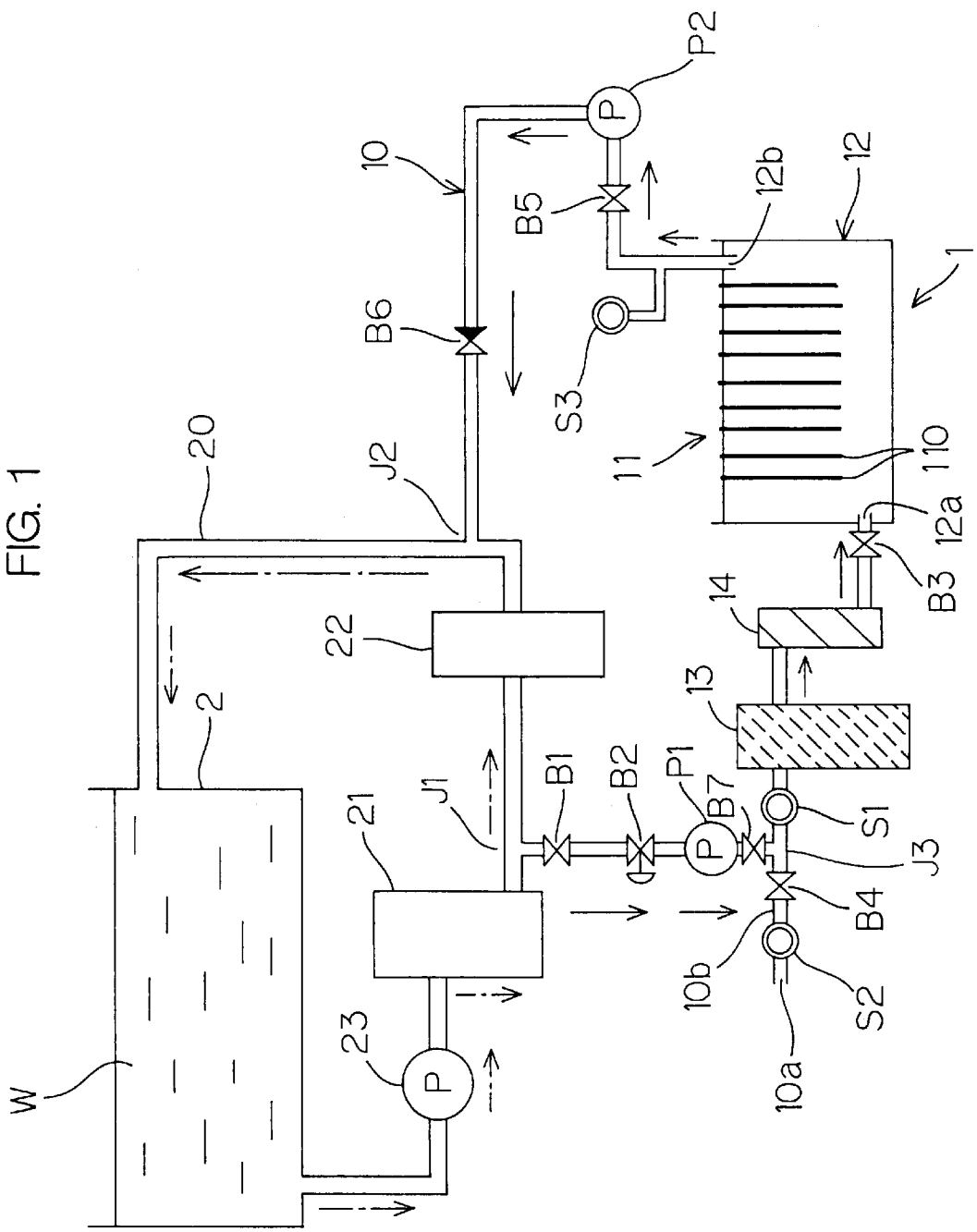
FIG. 1 is a diagram schematically showing a structure in which a water treatment device according to an embodiment of the present invention is incorporated into a large-sized pool such as a swimming pool or a bathtub of a public bath.

FIG. 1 is a diagram schematically showing a structure in which a water treatment device 1 according to an embodiment of the present invention is incorporated into a large-sized pool 2 such as a swimming pool or a bathtub of a public bath.

The pool 2 comprises a main circulating path 20 for circulating water W stored therein. A circulating pump 23, a filter 21 for sand filtration, and a heat exchanger 22 for heating the water W are arranged on the main circulating path 20. The water W in the pool 2 is circulated on the main circulating path 20, as indicated by an arrow with a chain line.

The water treatment device 1 has a water treating path 10, as indicated by an arrow with a sold line, which is branched from a first branching point J1, on the downstream side of the filter 21, on the main circulating path 20 to take up water and is merged at a second branching point J2 of the heat exchanger 22 on the main circulating path 20 to return the water.

A valve B1, a pressure reducing valve B2 for reducing pressure, a circulating pump P1, an adjusting valve B7 for flow rate adjustment, a conductivity sensor S1 for measuring the total concentration of ions in the water, a filter 13 for filtration, an ion exchange resin 14, a valve B3, an electrolytic tank 12 in electrolyzing and sterilizing means, a valve B5, a circulating pump P2, and a check valve B6 for preventing back flow are arranged on the water treating path 10.

A branching path 10b branched at a branching point J3, connected to a residual chlorine sensor S2 through an adjusting valve B4, and leading to a drain port 10a is connected between the adjusting valve B7 and the conductivity sensor S1 on the water treating path 10. The residual chlorine sensor S2 is preferably arranged as described above because a very small amount of water which is smaller than the quantity of water flowing through the water treating path 10 must be always caused to continuously flow in terms of its construction. A pressure gauge S3 for measuring the pressure of the water flowing out of the electrolytic tank 12 is provided on the water path on the side of an outlet of the electrolytic tank 12.

The electrolytic tank 12 comprises a plurality of pair of electrodes 11. Each of the pair of electrodes 11 has a plurality of plate-shaped electrodes 110. An example of the electrode 110 is preferably one obtained by coating the whole surface of a board made of titanium (Ti) with a thin film of a noble metal such as gold (Au), platinum (Pt), palladium (Pd), or platinum-iridium (Pt—Ir) by plating or sintering.

An example of the filter 13 is a non woven fabric made of a polypropylene fiber.

The function of the water treatment device 1 is as follows.

The water in the pool 2 is drawn by the circulating pump 23, and organic matter and sand are removed by sand filtration using the filter 21. The water is divided into water returned to the pool 2 through the heat exchanger 22 and water flowing into the water treating path 10 at the first branching point J1. The water flowing into the water treating path 10 is circulated by the circulating pump P1 after the water pressure and the flow rate thereof are respectively adjusted by the pressure reducing valve B2 and the adjusting valve B7. The water to be circulated is supplied via the conductivity sensor S1 to the filter 13, where the organic matter is removed from the water. The water, from which the organic matter has been removed, is supplied to the electrolytic tank 12 via the valve B3 after ions such as $Ca^{2+}$ and $Mg^{2+}$ are removed from the water by the ion exchange resin 14. Further, a part of the water is drained from the drain port 10a via the residual chlorine sensor S2.

In the electrolytic tank 12, DC current is caused to flow through the pairs of electrodes 11, so that electrolysis based on the above-mentioned reaction formula is performed. The water is sterilized by a chlorine compound such as a hypochlorous acid (HClO), its ion (ClO$^-$), or chlorine gas ($Cl_2$) which is generated by the reaction, active oxygen ($O_2^-$) generated for a very short time in the reaction process, or the like.

The water which has passed through the electrolytic tank 12 is circulated by the circulating pump P2 via the valve B5 after the pressure thereof is measured by the pressure gauge S3. The water to be circulated is merged into the water on the main circulating path 20 at the second branching point J2 via the check valve B6 and is returned to the pool 2. In this case, the amount of pressure reduced by the pressure reducing valve B2 is adjusted depending on the water pressure measured by the pressure gauge S3 in order to prevent the pressure inside the electrolytic tank 12 from being extremely increased.

In the water treatment device 1, the circulating pumps P1 and P2 for circulating the water are arranged on both the upstream side and the downstream side of the electrolytic tank 12 on the water treating path 10. In this case, the water pressure in the electrolytic tank 12 can be reduced by the water drawing function of the circulating pump P2 on the downstream side. Consequently, it is possible to more reliably prevent the water from leaking particularly out of a portion from which wiring is pulled out or the like, of the electrolytic tank 12 as well as to simplify a sealing structure of the portion from which the wiring is pulled out, as compared with the case where the circulating pump P1 is arranged only on the upstream side.

When the total concentration of ions measured by the conductivity sensor S1 is low, efficient electrolytic reaction may not be performed. In this case, it is preferable that an electrolyte containing a chlorine ion is supplied to the water treating path 10 in the state of a solution, as required.

Figure 2:
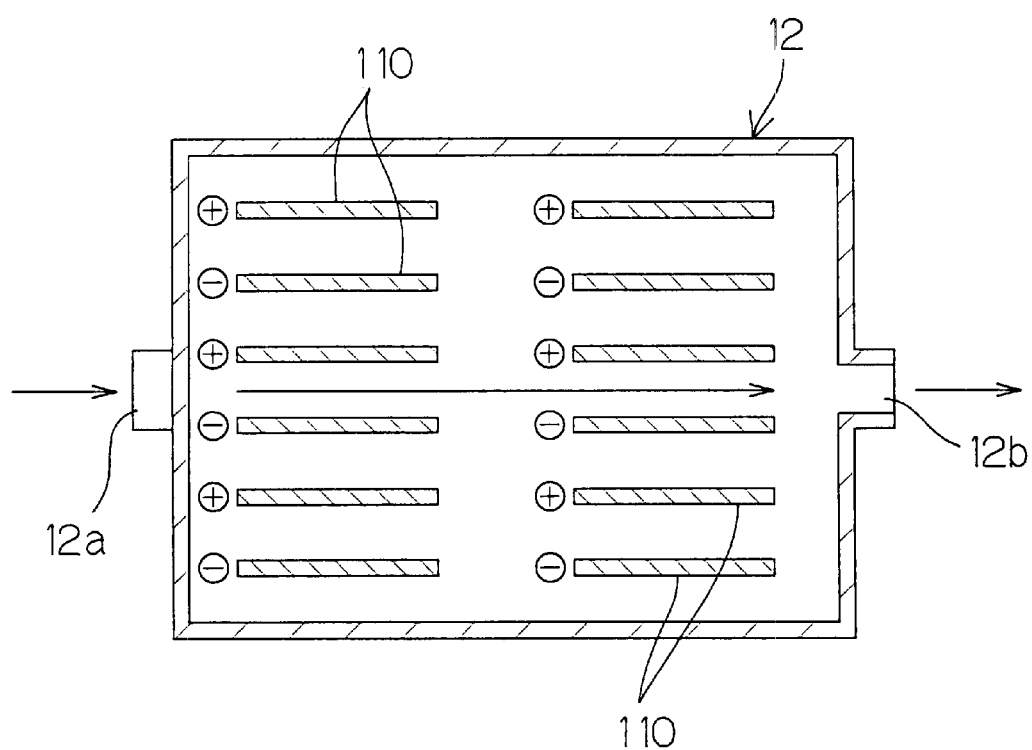
FIG. 2 is a transverse sectional view of an electrolytic tank incorporated into the water treatment device shown in FIG. 1.

It is preferable that the plurality of electrodes 110 constituting the pair of electrodes 11 are arranged in a direction parallel to the flow of water (indicated by an arrow with a solid line) from a water inlet 12a to a water outlet 12b in the electrolytic tank 12, as shown in FIG. 2. Such an arrangement makes it possible to minimize resistance to the flow of water which arises in the electrodes 110 as well as to further improve the effect of preventing water leakage by further reducing the water pressure in the electrolytic tank 12.

In a case where a pan if is arranged below the electrolytic tank 12, as shown in FIG. 3, even if the water leaks in the electrolytic tank 12, the danger of short, leakage, or the like due to the water which has leaked can be minimized. Reference character 1g denotes a draining path for draining the water received by the pan if to a draining section (a draining trench, etc.) outside the device.

It is preferable that at least inner surfaces, in contact with the water, of the electrolytic tank 12 and piping constituting the water treatment path 10 are formed of a material having corrosion resistance in order to prevent corrosion by a chlorine compound or active oxygen generated by electrolytic reaction. Examples of the material having corrosion resistance to the chlorine compound or the active oxygen include resins such as polyethylene, polypropylene, polyvinyl chloride, and Teflon, and metals such as titanium. The whole of the piping constituting the water treating path 10 and the whole of the electrolytic tank 12 may be formed of the material. In order to prevent the water from leaking by the water pressure to further improve the effect of preventing the water from leaking, it is preferable that the piping itself constituting the water treating path 10 and the electrolytic tank 12 itself are formed of a metal material having pressure resistance, and a layer (F in a circle shown in FIG. 3) made of the above-mentioned material is formed on inner surfaces, in contact with the water, of the piping and the electrolytic tank 12. Specific examples of the electrolytic tank 12 include one formed of a carbon steel plate or the like for a pressure container as a whole and having its inner surface coated or lined with the above-mentioned resin, and one having the same inner surface coated with a titanium foil, an evaporation film, a spraying film, or the like. Further, specific examples of the piping constituting the water treating path include a steel pipe having its inner surface lined with resin.

FIGS. 4(a) and 4(b) are diagrams showing the appearance of the water treatment device 1 which is formed as a unit in a cabinet 1a. The unit is located in facilities such as a swimming pool.

A filter 1b containing the filter 13 and the ion exchange resin 14, the electrolytic tank 12, and the circulating pump P2, a water treating path for connecting the members to one another, a power supply device 1c for supplying power for operating the respective members of the device, as described above, and a microcomputer (a sequencer) 1d constituting a control section for operating the members in accordance with a predetermined procedure, and the pan 1f are arranged in the cabinet 1a. Further, a solution tank 30a for storing the electrolytic solution for supply, described above, and a fixed delivery pump P3 for supplying the electrolytic solution stored in the solution tank 30a to the water treating path are arranged adjacent to the cabinet 1a and outside thereof, indicated by an chain double-dashed line in the figure. The members are connected to one another by a supplying path 30b for supplying the electrolytic solution and an introducing path 30c for supplying the water to the solution tank 30a.

Figure 5:
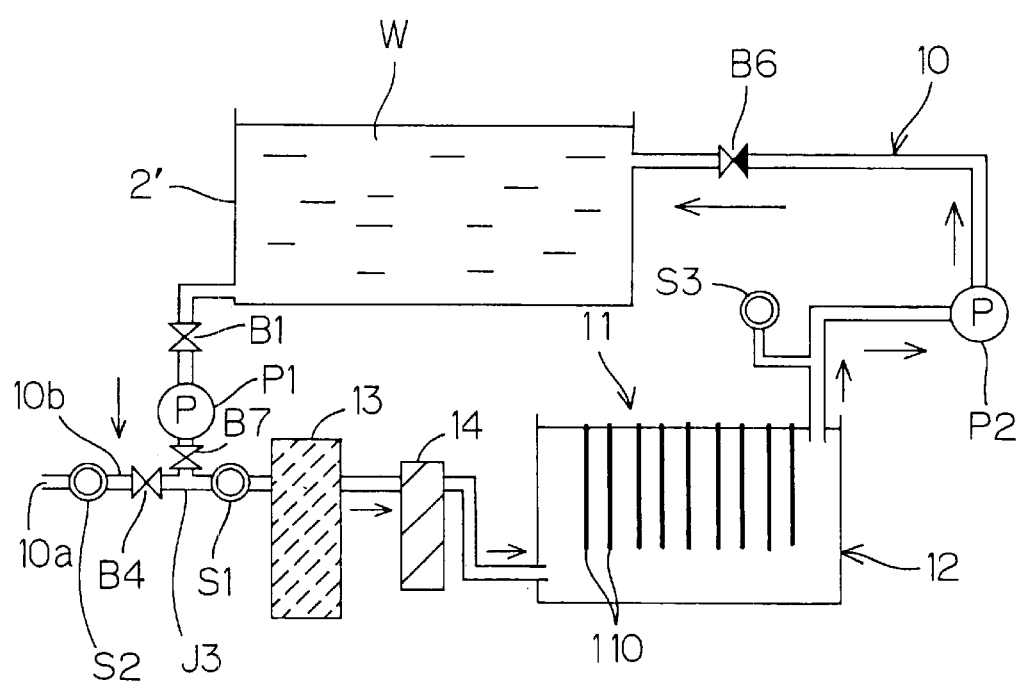
FIG. 5 is a diagram schematically showing a structure in which a water treatment device according to another embodiment of the present invention is incorporated into a small-sized pool such as a water supply tank disposed on the roof of a building or a home bathtub.

FIG. 5 is a diagram schematically showing a structure in which a water treatment device 1 according to another embodiment of the present invention is incorporated into a small-sized pool 2' such as a water supply tank disposed on the roof of a building or a home bathtub. In this example, the above-mentioned main circulating path 20 is not inherently provided. Accordingly, a water treating path 10 in the water treatment device 1 is directly connected to the pool 2', to simplify the entire construction thereof.

Respective members arranged on the water treating path 10 are basically the same as those in the embodiment shown in FIG. 1. Since high pressure as in a case where the water treating path 10 is connected to the large-sized pool 2 is not applied to the water treating path 10, the pressure reducing valve B2 can be omitted. Further, the valves B3 and B5 are also omitted. The same members as those shown in FIG. 1 are assigned the same reference characters.

A check valve B6 is provided at this position, shown in FIG. 5, because a final end of the water treating path 10 is connected to a portion, below a normal water surface of water W, of the pool 2', and the water W must be prevented from flowing back into the water treating path 10. When the final end of the water treating path 10 is connected to a portion, above the normal water surface of the water W, of the pool 2' and is opened to the air, the check valve B6 can be omitted.

Figure 6:
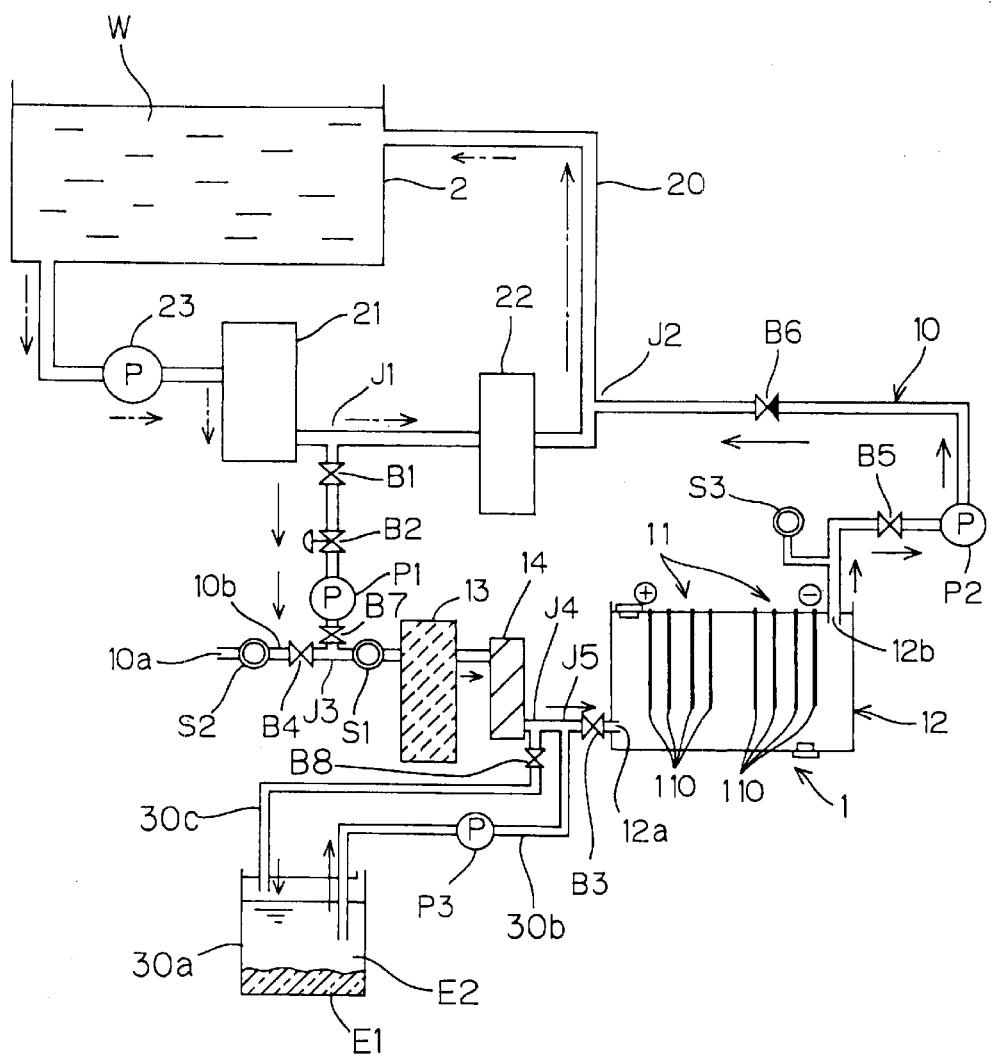
FIG. 6 is a diagram showing the construction of a water treatment device for a large-sized pool according to another embodiment of the present invention.

FIG. 6 is a diagram showing the construction of a water treatment device 1 for a large-sized pool 2 according to another embodiment of the present invention. The construction shown in FIG. 6 differs from the construction shown in FIG. 1 in that it comprises a path for adding an electrolytic solution including the solution tank 30a described in FIGS. 4(a) and 4(b), and so forth. Specifically, an introducing path 30c is branched from a branching point J4 between an ion exchange resin 14 and a valve B3 on a water treating path 10. A valve B8 is interposed halfway on an introducing path 30c. Water is supplied to the solution tank 30a through the introducing path 30c by opening the valve B8. An electrolyte E1 such as sodium chloride is contained in the solution tank 30a. The water is supplied to the solution tank 30a, so that the water in the solution tank 30a is agitated. Consequently, an electrolytic solution E2 having a saturation concentration is produced and is stored. The electrolytic solution E2 is sucked up through a supplying path 30b by a fixed delivery pump P3, is merged into the water treating path 10 at a branching point J5 on the downstream side of the branching point J4, and is supplied to an electrolytic tank 12. The same members as those shown in FIG. 1 are assigned the same reference characters.

As the electrolyte E1 to be contained in the solution tank 30a, sodium chloride, described above, may be replaced with calcium chloride, hydrochloric acid, or the like, provided that it contributes to electrolytic reaction of the water. However, a solid electrolyte is preferable because it has the advantage that the number of times of supply of the electrolyte can be reduced, as previously described, or the like.

It is judged whether or not a pair of electrodes 11 is energized to perform the electrolytic reaction depending on the water quality which is presumed from the results of measurement made by the residual chlorine sensor S2. Contrary to this, the presence or absence of supply of the electrolytic solution E2 from the solution tank 30a to the water treating path 10 and the amount of the supply are judged on the basis of the total concentration of ions measured by a conductivity sensor S1. That is, when the total concentration of ions in the water is low, and the conductivity of the water is low, the electrolytic reaction cannot be efficiently performed. Accordingly, the electrolytic solution E2 in such an amount that the total concentration of ions is not less than a predetermined value is supplied to the water treating path 10 from the solution tank 30a. The reason for this is that the residual chlorine concentration and the conductivity of the water do not necessarily coincide with each other. That is, there is a case where even if the residual chlorine concentration of the water is low, the conductivity thereof is sufficiently high, so that the electrolytic solution may not be supplied. In the case, even if the electrolytic solution is supplied because the residual chlorine concentration of the water is low, there occur circumstances where the value of current flowing through the pair of electrodes 11 is abnormally increased in the case of the electrolytic reaction. The amount of the electrolytic solution supplied once is preferably adjusted such that the value of current flowing through the pair of electrodes 11 falls within an allowable range.

Figure 7:
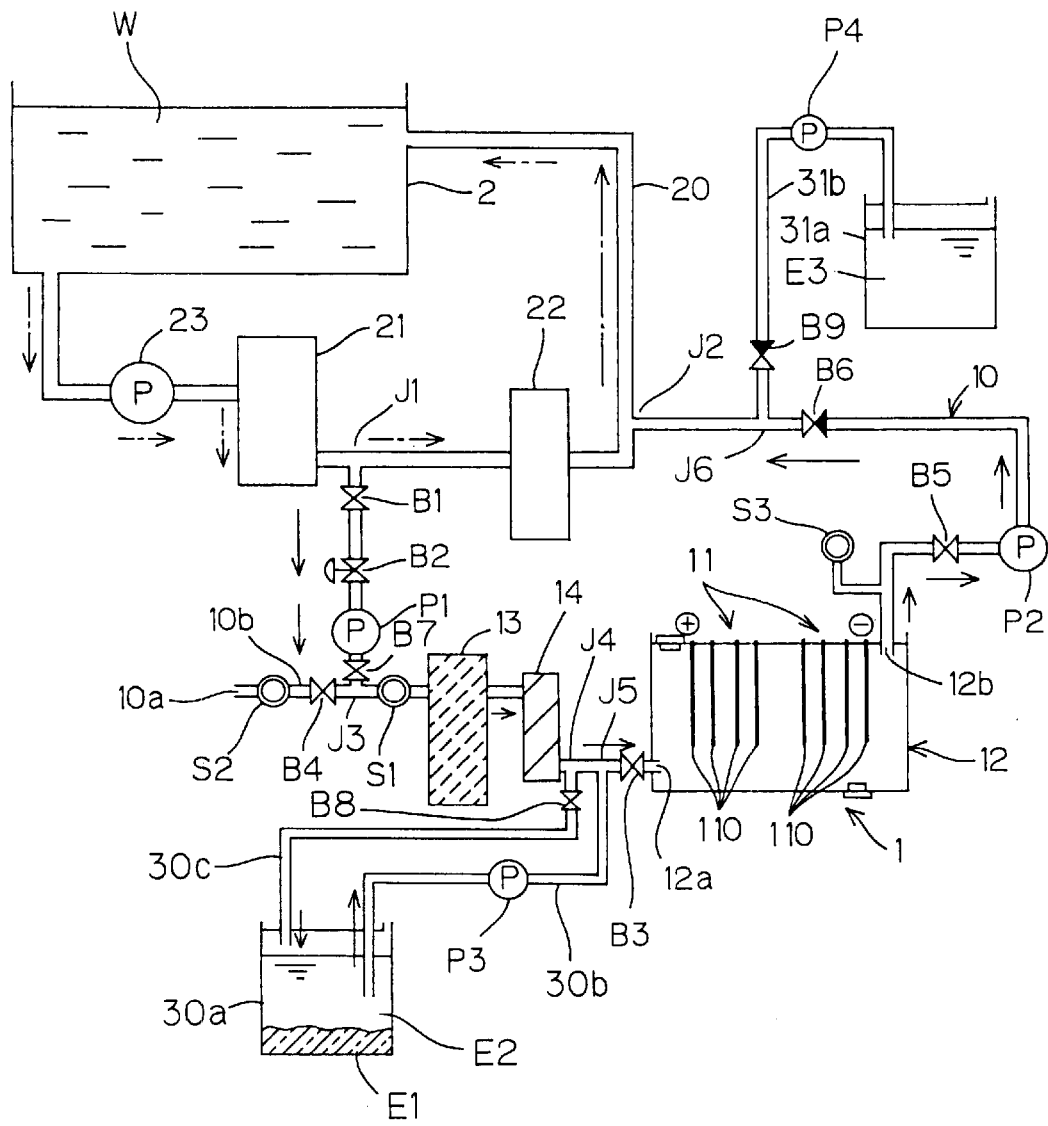
FIG. 7 is a diagram showing the construction of a water treatment device for a large-sized pool according to another embodiment of the present invention.

FIG. 7 is a diagram showing the construction of a water treatment device 1 for a large-sized pool 2 according to another embodiment of the present invention. The construction shown in FIG. 7 differs from the construction shown in FIG. 6 in that a sterilizing solution tank 31a to put in and store a sterilizing solution E3 containing a chlorine ion, for example, a solution of sodium hypochlorite is added. Specifically, a supplying path 31b is branched from a branching point J6 between a check valve B6 and a second branching point J2 on a water treating path 10 to reach the sterilizing solution tank 31a. A check valve B9 and a fixed delivery pump P4 are interposed halfway on the supplying path 31b. The sterilizing solution E3 stored in the sterilizing solution tank 31a is sucked up through the supplying path 31b by the fixed delivery pump P4, is merged at the branching point J6 through the check valve B9, and is supplied to the water treating path 10. The same members as those shown in FIG. 6 are assigned the same reference characters.

In such construction, water can be efficiently sterilized by supplying the sterilizing solution E3 from the sterilizing solution tank 31a even when it cannot be sufficiently sterilized only by electrolytic reaction in electrolyzing and sterilizing means, previously described. For example, the amount of free chlorine generated by the electrolytic reaction in the electrolyzing and sterilizing means is approximately one gram per minute when a solution of salt (having a concentration of 0.03%) is electrolyzed for one minute under the condition that the whole surface area of electrodes 110 is 1.4 m$^2$ and the load voltage is 12 V. Contrary to this, the amount of free chlorine supplied in a case where a 10% solution of sodium hypochlorite is directly supplied as a sterilizing solution to the water treating path 10 is approximately 10 grams per minute when the amount of the supplied solution is 100 milliliters per minute. If the water quality of the water in the pool is not significantly lowered, therefore, it is preferable that the sterilization is performed by the electrolytic reaction in the electrolyzing and sterilizing means because it can be arbitrarily or periodically performed even during the business hours of the pool, the bath, or the like although the amount of generated free chlorine is small. On the other hand, when the water quality of the water in the pool is significantly lowered by the number of visitors, the weather, the temperature, or the like, it is preferable that a method of directly supplying the sterilizing solution is simultaneously used because the water quality can be improved in a short time. The sterilizing solution is supplied generally in the state of a solution and preferably in the state of a diluted solution. The sterilizing solution is supplied particularly in the latter state, thereby making it possible to lessen a problem caused by stimulation of the sterilizing solution.

Figure 8:
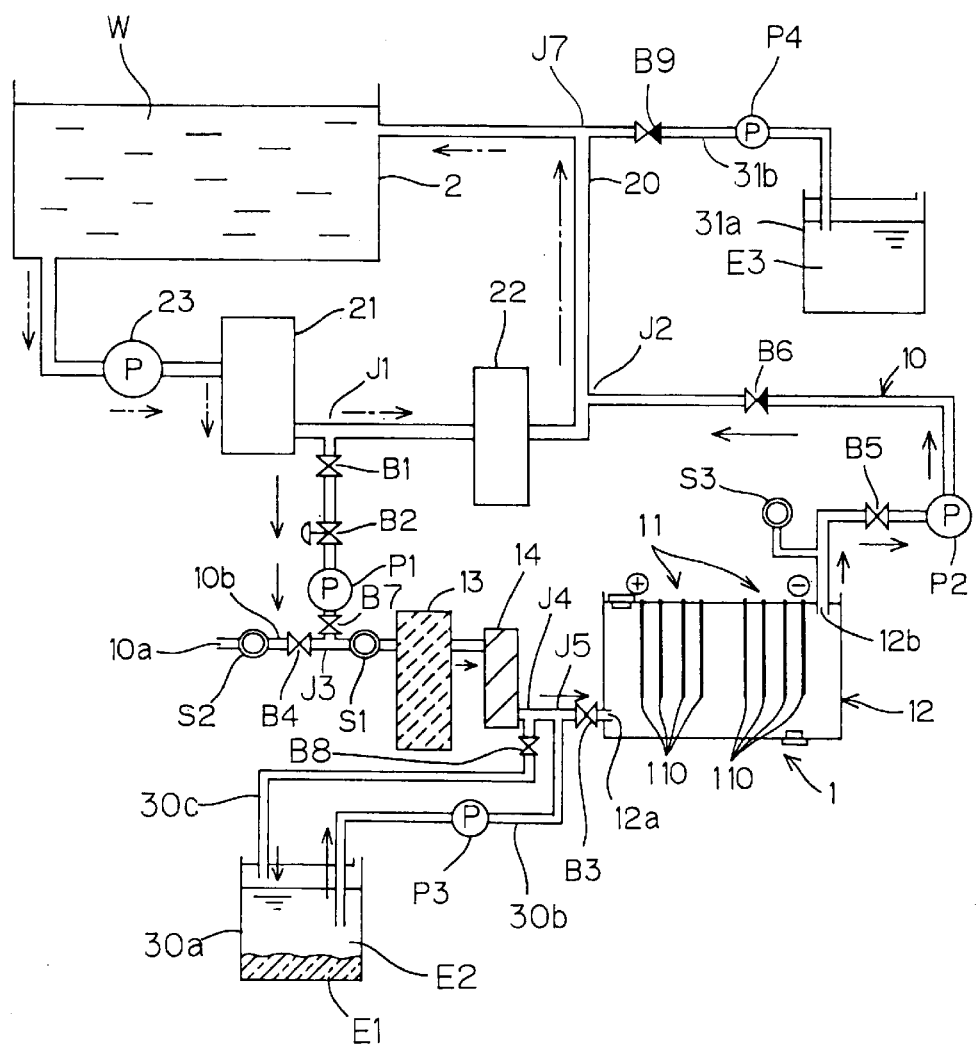
FIG. 8 is a diagram showing the construction of a water treatment device for a large-sized pool according to another embodiment of the present invention.

FIG. 8 is a diagram showing the configuration of a water treatment device 1 for a large-sized pool 2 according to another embodiment of the present invention. The construction shown in FIG. 8 differs from the construction shown in FIG. 7 in that a sterilizing solution tank 31a is connected to not a water treating path 10 but a main circulating path 20. Specifically, a supplying path 31b is branched from a branching point J7 between a second branching point J2 and the pool 2 on the main circulating path 20 to reach the sterilizing solution tank 31a. A check valve B9 and a fixed delivery pump P4 are interposed halfway on the supplying path 31b. A sterilizing solution E3 stored in the sterilizing solution tank 31a is sucked up through the supplying path 31b by the fixed delivery pump P4, is merged at the branching point J7 through the check valve B9, and is supplied to the main circulating path 20. The same members as those shown in FIG. 6 are assigned the same reference characters.

In such construction, even when the supply of water to the water treating path 10 is stopped, for example, the water treating path 1 is maintained, water can be sterilized by supplying the sterilizing solution E3 to the water through a route different from the water treating path 10.

Figure 9:
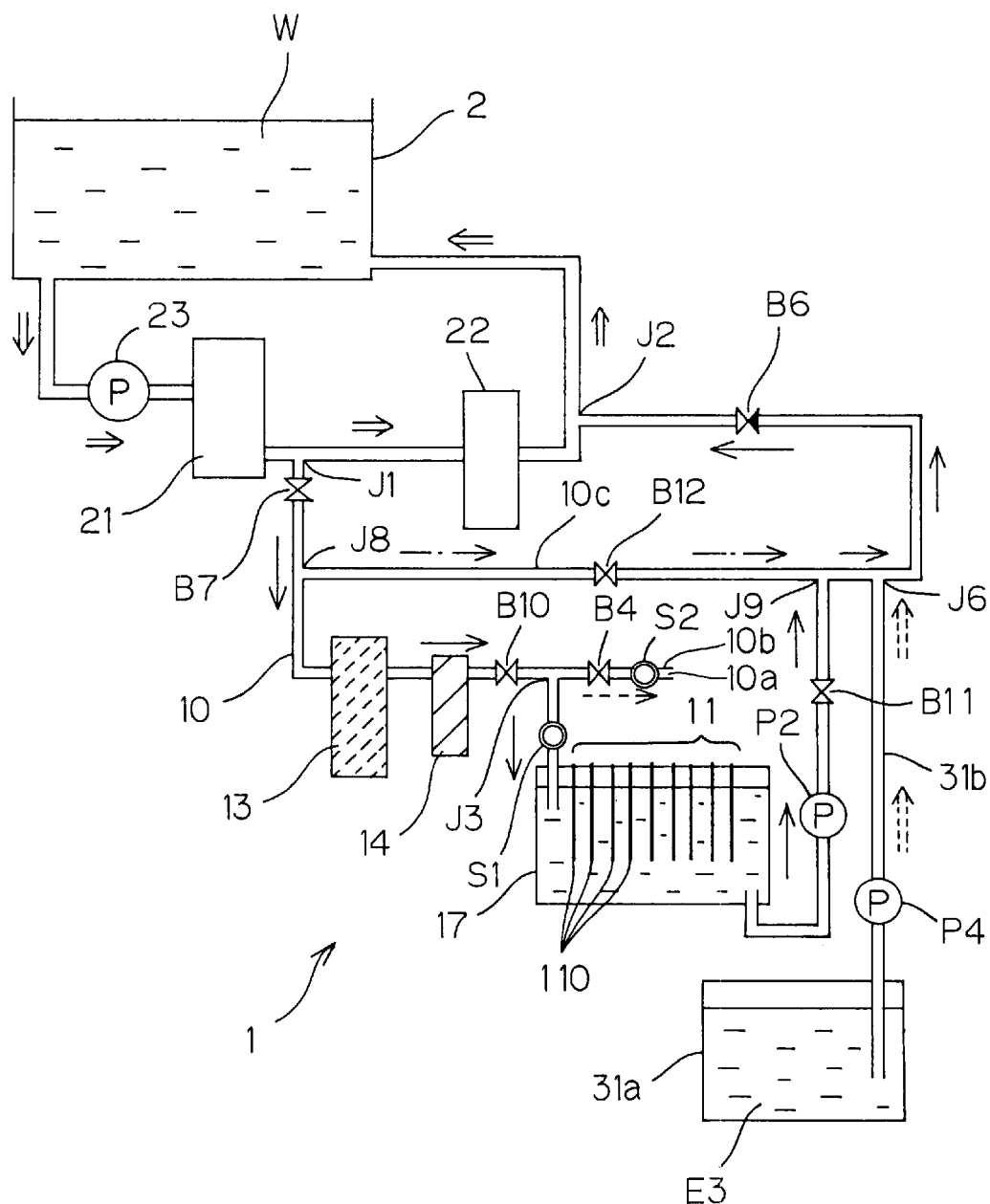
FIG. 9 is a diagram showing the construction of a water treatment device for a large-sized pool according to another embodiment of the present invention.

FIG. 9 is a diagram showing the construction of a water treating path 1 for a large-sized pool 2 according to another embodiment of the present invention.

The water treatment device 1 in the present embodiment comprises a water treating path 10 connected to a main circulating path 20. An adjusting valve B7, a filter 13, an ion exchange resin 14, a valve B10, and a conductivity sensor S1 are arranged halfway from a first branching point J1 to an electrolytic tank 12 on the water treating path 10. A branching path 10b branched at a branching point J3, connected to a residual chlorine sensor S2 through an adjusting valve B4, and leading to a drain port 10a is connected between a valve 9 and the conductivity sensor S1 on the water treating path 10. Further, a circulating pump P2, an adjusting valve B11 for flow rate adjustment, and a check valve B6 are arranged in this order halfway from the electrolytic tank 12 to a second branching point J2. A supplying path 31b branched at a branching point J6 and leading to a sterilizing solution tank 31a storing a sterilizing solution E3 is connected between the adjusting valve B11 and the check valve B6 on the water treating path 10. A fixed delivery pump P4 is arranged on the supplying path 31b. The above-mentioned construction is approximately the same as that shown in FIG. 8.

A principal difference of the construction shown in FIG. 9 from the construction shown in FIG. 8 is that there is provided a bypass path 10c branched on the upstream side of the electrolytic tank 12 on the water treating path 10 and merged into the water treating path 10 on the downstream side of the electrolytic tank 12 and on the upstream side of the branching point J6 on the supplying path 31b. Specifically, the bypass path 10c is branched at a branching point J8 between the adjusting valve B7 and the filter 13 on the water treating path 10 and is merged into the water treating path 10 at a branching point J9 between the adjusting valve B11 and the branching point J6 through a valve B12. When the water treating path 1 is maintained or develops a fault, as described above, or when the residual chlorine concentration is rapidly lowered, the sterilizing solution E3 is supplied to the water from the supplying path 31b to sterilize the water while closing the valve B10 as well as opening the valve B12 to circulate the water through the bypass path 10c having a low pressure loss. The switching may be performed by hand. Switching at the time of a rapid drop in the residual chlorine concentration may be automatically performed on the basis of the measured value of the residual chlorine concentration by the residual chlorine sensor S2.

Figure 10:
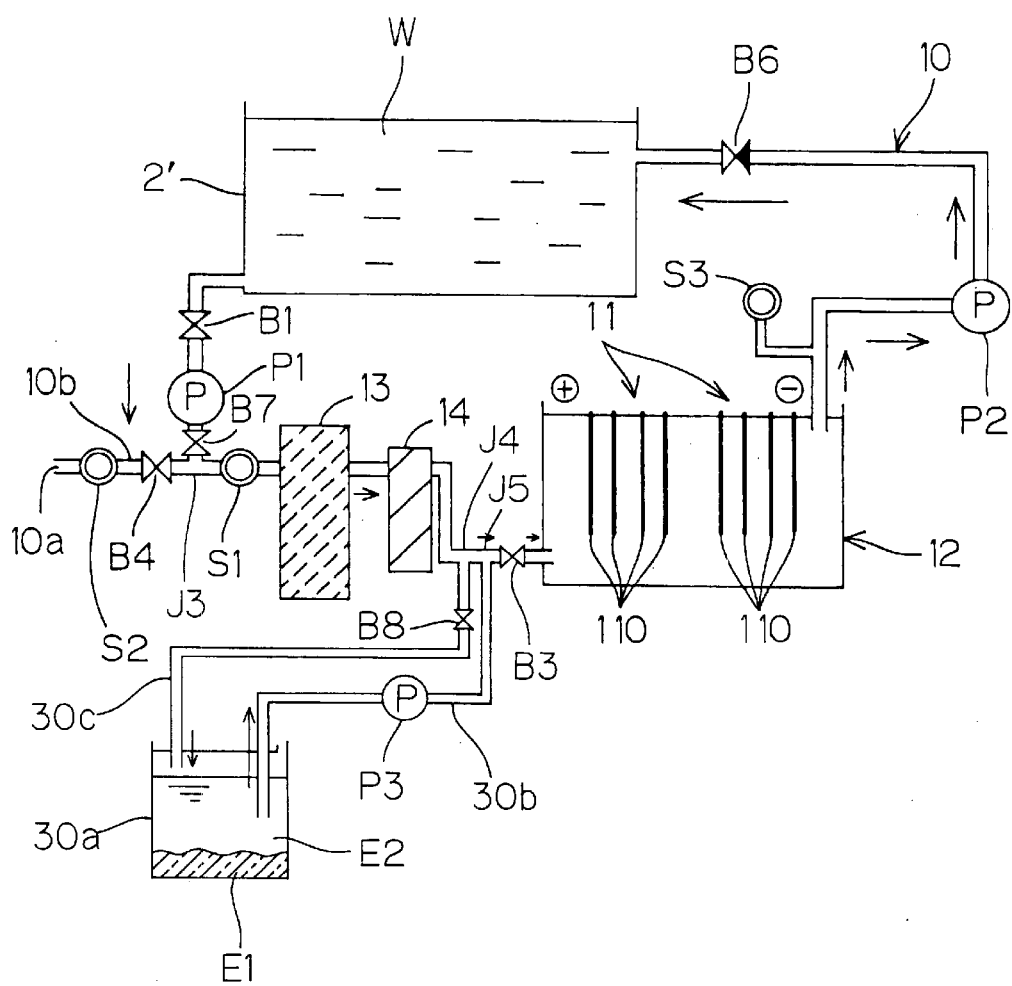
FIG. 10 is a diagram showing the construction of a water treatment device for a small-sized pool according to another embodiment of the present invention.

FIG. 10 is a diagram showing the construction of a water treatment device 1 for a small-sized pool 2' according to another embodiment of the present invention. The construction shown in FIG. 10 differs from the construction shown in FIG. 5 in that a path for adding an electrolytic solution including a solution tank 30a or the like is provided. In other words, the construction shown in FIG. 10 is an example in which the concentration shown in FIG. 6 is applied to the water treating device 1 for the small-sized pool 2'.

Specifically, an introducing path 30c is branched from a branching point J4 between an ion exchanged resin 14 and a valve B3 on a water treating path 10 directly connected to the pool 2'. A valve B8 is interposed halfway on the introducing path 30c. Water is supplied to the solution tank 30a through the introducing path 30c by opening the valve B8. An electrolyte E1 such as sodium chloride is contained in the solution tank 30a. The water is supplied to the solution tank 30a, so that the electrolyte E1 in the solution tank 30a is agitated. Accordingly, an electrolytic solution E2 having a saturation concentration is produced and stored in the solution tank 30a. The electrolytic tank E2 is sucked up through a supplying path 30b by a fixed delivery pump P3, is merged into the water treating path 10 at a branching point J5 on the downstream side of the branching point J4, and is supplied to an electrolytic tank 12. The same members as those shown in FIG. 5 are assigned the same reference characters.

Figure 11:
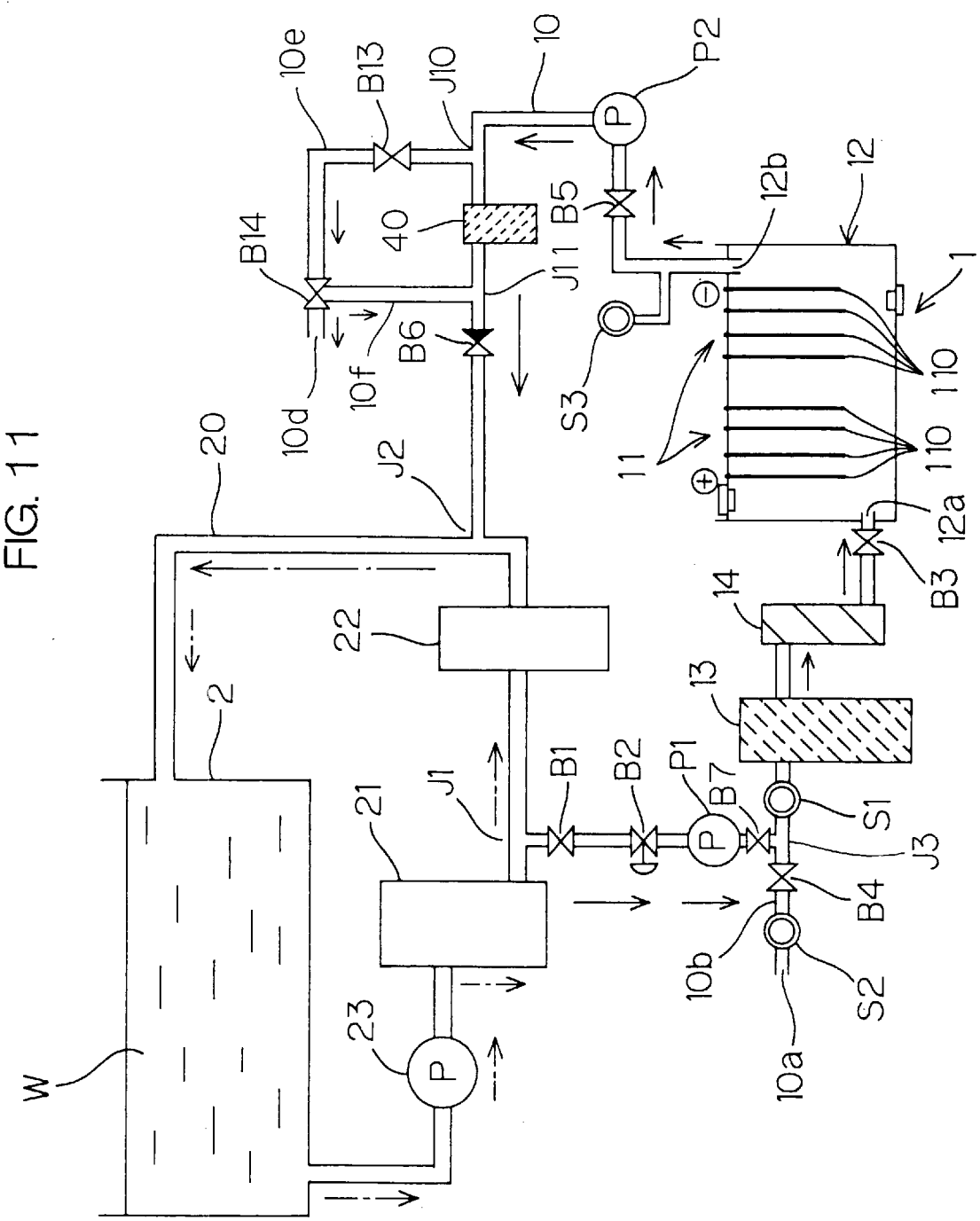
FIG. 11 is a diagram showing the construction of a water treatment device for a large-sized pool according to another embodiment of the present invention.

FIG. 11 is a diagram showing the construction of a water treatment device 1 for a large-sized pool 2 according to another embodiment of the present invention. The construction shown in FIG. 11 differs from the construction shown in FIG. 1 in that a gas separating filter for separating gas generated by electrolysis, from water is provided on a water treating path 10. Specifically, a filter case 40 containing the gas separating filter is provided between a circulating pump P2 and a check valve B6 on the water treating path 10. A branching path 10e branched at a branching point J10 and leading to a drain port 10d released to the air is connected between the circulating pump P2 and the filter case 40 on the water treating path 10. A valve for removing bubbles (an air vent valve) B13 and a three way valve B14 are arranged on the branching path 10e. A branching path 10f further branched from the branching path 10e and leading to a branching point J11 between the filter case 40 and the check valve B6 on the water treating path 10 is connected to the three way valve B14. The same reference members as those shown in FIG. 1 are assigned the same reference characters.

Figure 12:
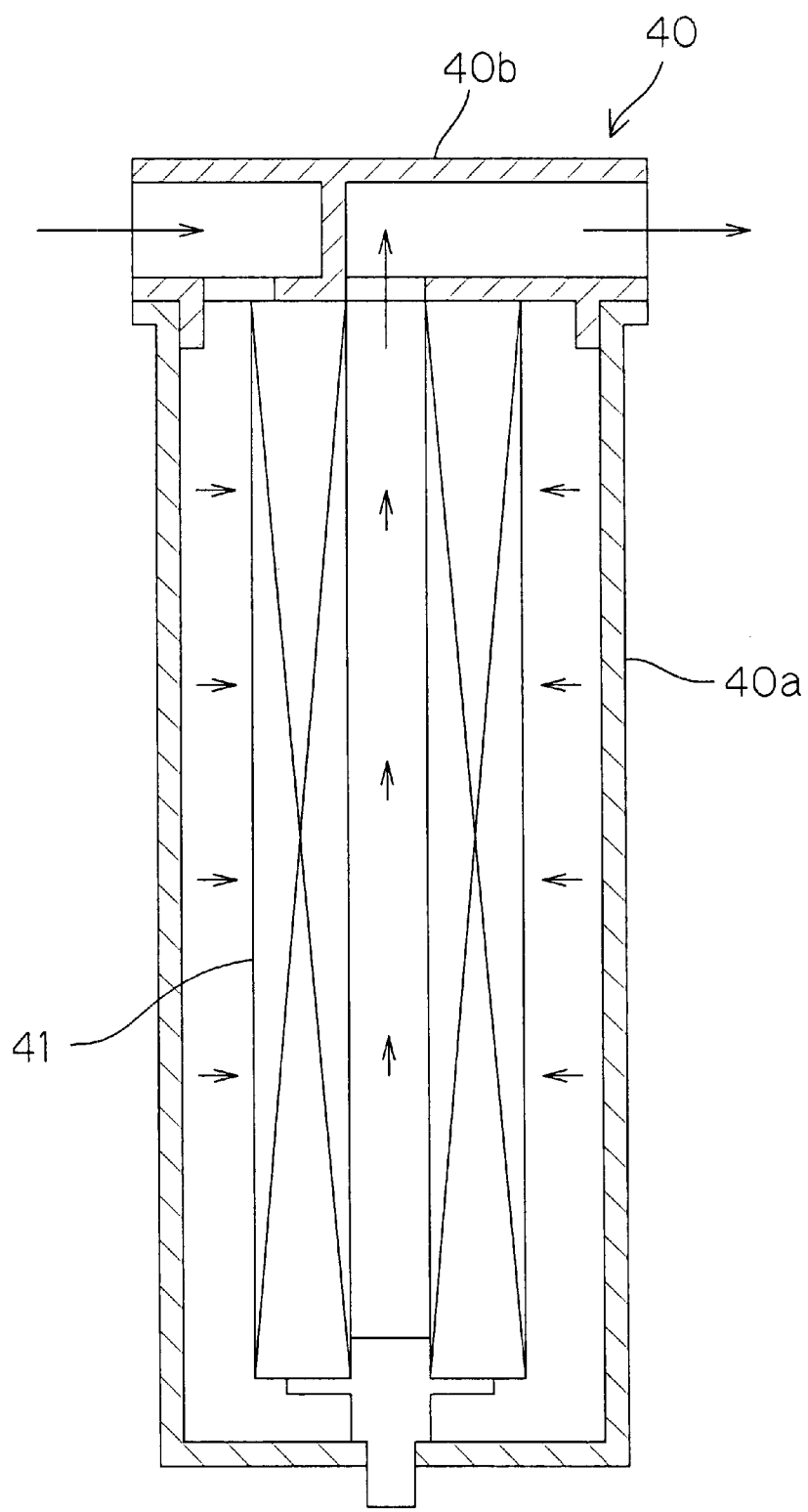
FIG. 12 is a cross-sectional view showing a gas separating filter incorporated into the device shown in FIG. 11 and a filter case containing the gas separating filter.

FIG. 12 is a cross-sectional view showing the internal construction of the filter case 40. The filter case 40 comprises a gas separating filter 41 formed in a cylindrical shape, a lower case 40a, having a cylindrical shape and having a bottom, containing the gas separating filter 41, and an upper case 40b closing an upper opening of the lower case 40a and connected to the water treating path 10.

The gas separating filter 41 has the function of passing water but capturing included fine bubbles without passing them. Usable as such a gas separating filter 41 is a non woven fabric made of a natural filter or a chemical fiber. Particularly preferable is a non woven fabric formed of a polypropylene fiber having sufficient resistance to a chlorine compound or active oxygen generated by electrolytic reaction in electrolyzing and sterilizing means and being fine so as not to easily pass fine bubbles. When the average diameter of a through hole is preferably 1 to 100 $\mu$m and particularly, approximately 10 to 50 $\mu$m. If the size of the through hole is less than the range, the resistance of the gas separating filter 41 to the flow of water is too high. Accordingly, the efficiency in sterilizing the water by the water treatment device 1 may be reduced. Conversely, when the average diameter exceeds the range, the effect of capturing fine bubbles without passing them is insufficient. Accordingly, the efficiency in removing fine bubbles may be reduced. In order to form the gas separating filter 41 in a cylindrical shape, a sheet-shaped gas separating filter 41 may be wound in a roll shape at least one or more times such that no clearance occurs along its circumference. Further, the gas separating filter 41 folded in a pleated shape may be brought into a cylindrical shape with both its ends overlapped with each other such that no clearance occurs along its circumference.

The water which has reached the filter case 40 upon flowing through the water treating path 10 flows into the lower case 40a from an inlet on the left side of the upper case 40b, as indicated by an arrow with a solid line in FIG. 12. The water rises inside the cylinder of the gas separating filter 41 after the included fine bubbles are captured and separated by the gas separating filter 40 when it passes from the outside to the inside of the cylinder of the gas separating filter 41 contained in the lower case 40a, to flow out of an outlet on the right side of the upper case 40b. The water is returned to the pool 2 through the check valve B6 and a branching point J2, as described above. The fine bubbles captured by the gas separating filter 41 stay outside the cylinder of the gas separating filter 41 on the upstream side, that is, inside the lower case 40a. A lot of fine bubbles are coupled to one another to increase the diameter of the coupled fine bubbles, thereby producing a buoyant force. Accordingly, the fine bubbles enter a state where they can be easily separated from the water.

Two cases are considered as a case where the bubbles which have stayed are removed. One of the cases is a case where the bubbles are removed while the water treatment device 1 is running. In this case, the three way valve B14 is switched by selecting the time when no new fine bubbles are produced, that is, the time when the sterilization of the water by the electrolyzing and sterilizing means is stopped, or the like, to connect the branching paths 10e and 10f as well as to open the valve 13. Consequently, the bubbles, together with the water, are fed to the pool 2 through both the branching paths 10e and 10f, the check valve B6, and the branching point J2 by water supply from the circulating pump P2. However, the bubbles are coupled bubbles having a large diameter which can be easily separated from the water, as described above. Accordingly, the bubbles are quickly removed from the water in the pool 2 without making the water muddy. The other case is a case where the bubbles which stay in large amounts or gas which is a collection of the bubbles is removed when the running of the water treatment device 1 is stopped. In this case, the three way valve B14 is switched, to connect the branching path 10e to the drain port 10d as well as to open the valve B13. When the circulating pump P2 is operated to feed a little water, the gas which has stayed is discharged from the drain port 10d.

Figure 13:
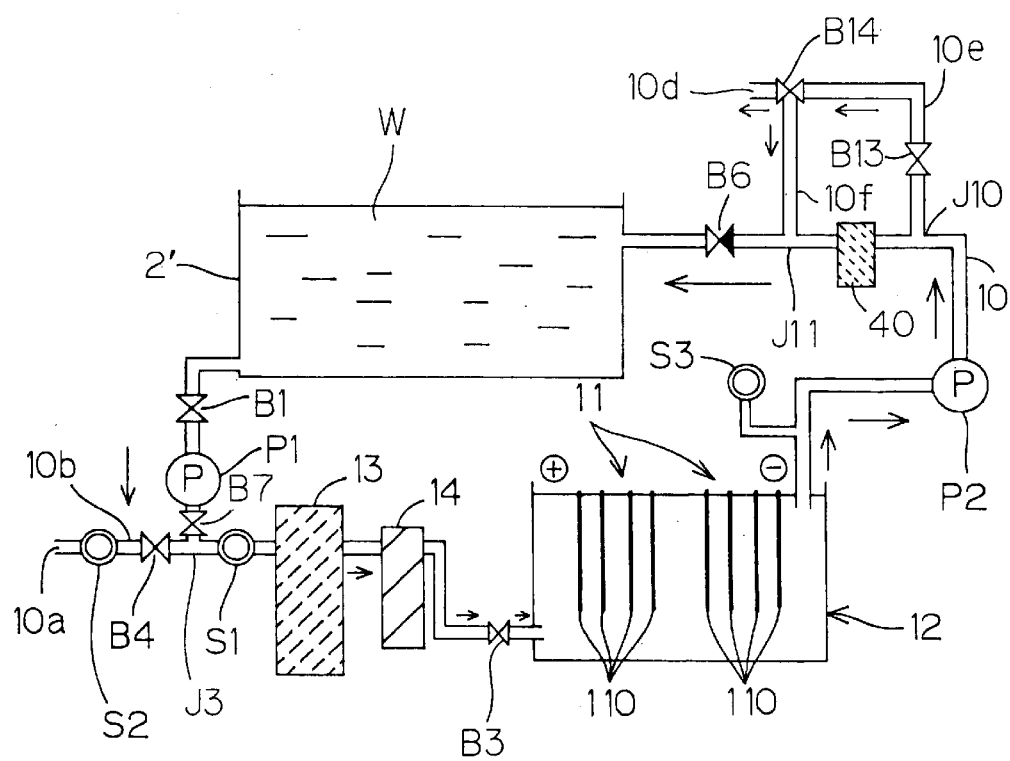
FIG. 13 is a diagram showing the construction of a water treatment device for a small-sized pool according to another embodiment of the present invention.

FIG. 13 is a diagram showing the construction of a water treatment device 1 for a small-sized pool 2' according to another embodiment of the present invention. The construction shown in FIG. 13 differs from the construction shown in FIG. 5 in that a filter case 40 containing a gas separating filter for separating gas generated by electrolysis, from water is provided on a water treating path 10. In other words, the construction shown in FIG. 13 is an example in which the construction shown in FIG. 11 is applied to the water treatment device 1 for the small-sized pool 2'. Specifically, the filter case 40 containing the gas separating filter is provided between a circulating pump P2 and a check valve B6 on the water treating path 10 directly connected to the pool 2'. A branching path 10e branched at a branching point J10 and leading to a drain port 10d released to the air is connected between the circulating pump P2 and the filter case 40 on the water treating path 10. An air vent valve B13 and a three way valve B14 are arranged on the branching path 10e. A branching path 10f further branched from the branching path 10e and leading to a branching point J11 between the filter case 40 and the check valve B6 on the water treating path 10 is connected to the three way valve B14. The functions of the members are the same as those shown in FIG. 11. The same members as those shown in FIG. 13 are assigned the same reference characters.

Figure 14:
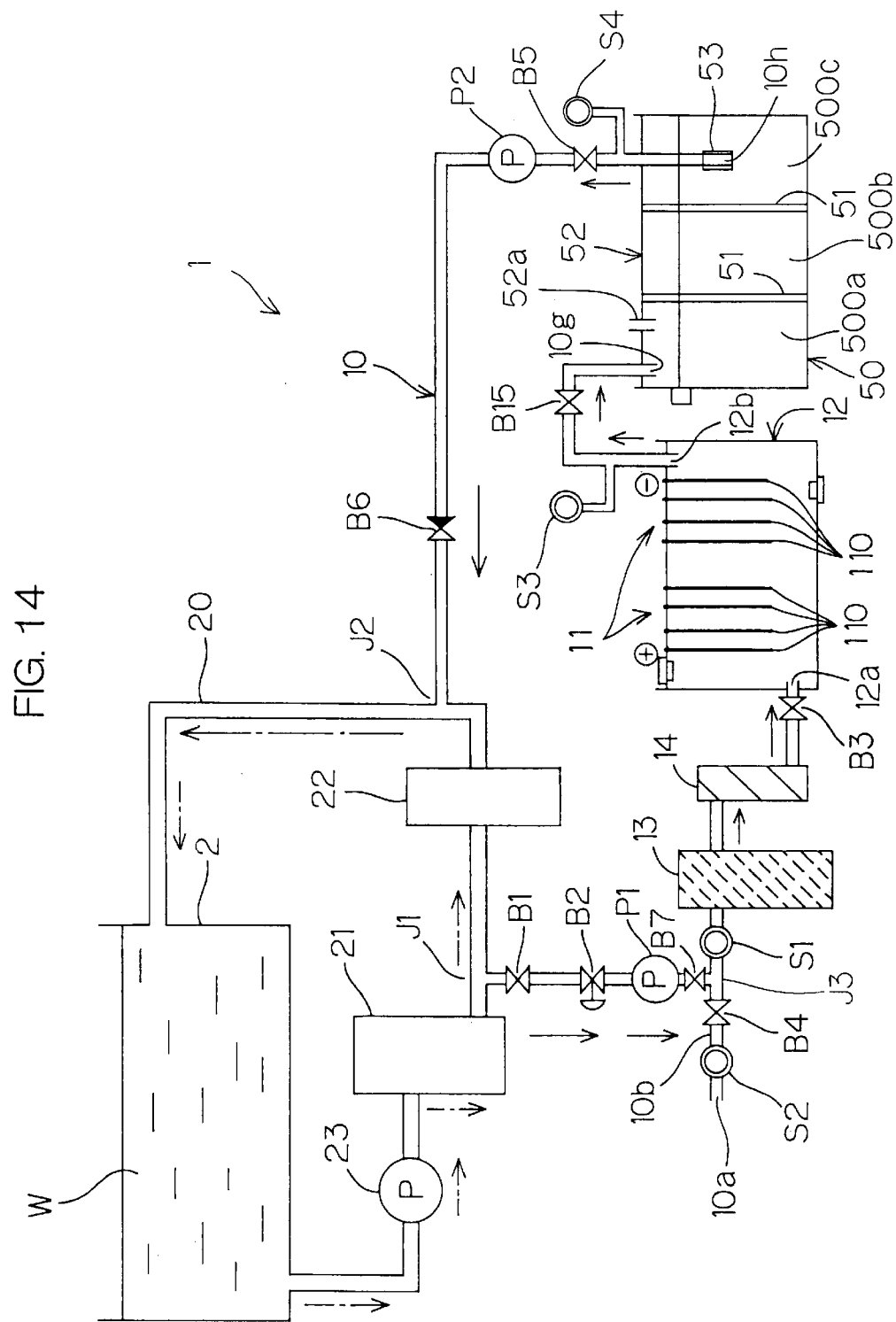
FIG. 14 is a diagram showing the construction of a water treatment device for a large-sized pool according to another embodiment of the present invention.

FIG. 14 is a diagram showing the construction of a water treatment device 1 for a large-sized pool 2 according to another embodiment of the present invention. The construction shown in FIG. 14 differs from the construction shown in FIG. 11 in that a gas/liquid separating tank 50 is provided on the downstream side of an electrolytic tank 12 on a water treating path 10, and a gas separating filter 51 is arranged inside the gas/liquid separating tank 50. Specifically, a valve B15 and the gas/liquid separating tank 50 are provided between the electrolytic tank 12 and a valve B5 on the water treating path 10. The gas/liquid separating tank 50 is divided into three areas 500a to 500c form the upstream side to the downstream side of the flow of water by providing two plate-shaped gas separating filters 51 in FIG. 14.

Figure 15:
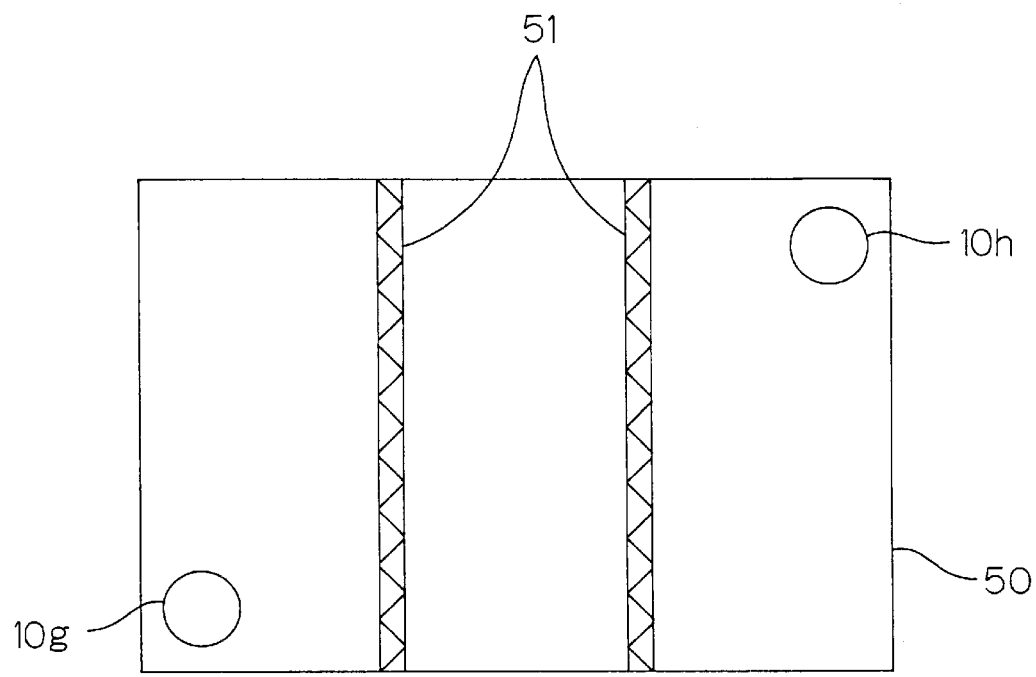
FIG. 15 is a diagram showing the positional relationship between a water inlet and a water outlet which are provided in a gas/liquid separating tank.

At a position, corresponding to the area 500a on the uppermost stream side, of a top plate 52 of the gas/liquid separating tank 50, a gas vent port 52a for draining separated gas outward from the tank is formed. Further, piping on the side of a water inlet 10g to the gas/liquid separating tank 50 on the water treating path 10 is also connected to the position, corresponding to the area 500a, of the top plate 52. At a position, corresponding to the area 500c on the lowermost stream side, of the top plate 52, piping on the side of a water outlet 10h from the gas/liquid separating tank 50 on the water treating path 10 is arranged in a state where it is inserted into the area 500c. The inlet 10g and the outlet 10h are arranged at corners on a diagonal line in the horizontal direction of the gas/liquid separating tank 50, as shown in FIG. 15. When they are thus arranged, the distance therebetween can be made large. Even when fine bubbles passing through the two gas separating filters 51 without being captured thereby are produced, the fine bubbles can be reliably prevented from being sucked in from the outlet 10h to flow into the pool 2. When the outlet 10h is coated with the gas separating filter 52 having the same function as that of the gas separating filter 51, as shown in FIG. 14, the fine bubbles can be more reliably prevented from being sucked in from the outlet 10h to flow into the pool 2.

A pressure gauge S4 for measuring the pressure of water flowing out of the gas/liquid separating tank 50 is provided on the water path on the side of the outlet of the gas/liquid separating tank 50. The same members as those shown in FIG. 11 are assigned the same reference characters.

The water which has reached the gas/liquid separating tank 50 upon flowing through the water treating path 10 is poured into the area 500a on the uppermost stream side from the inlet 10g. When the water is moved to the subsequent area 500b upon passing through the first gas separating filter 51 by a difference between pressure at which the water is poured by a circulating pump P1 on the upstream side and negative pressure at which the water is sucked out by a circulating pump P2 on the downstream side, most of the fine bubbles are captured by the first gas separating filter 51. The fine bubbles captured by the first gas separating filter 51 stay in the area 500a. Many of the fine bubbles are coupled to one another to increase the diameter of the coupled fine bubbles, as described above, thereby producing a buoyant force. The coupled fine bubbles rise to the surface of the water, are moved toward a gas phase on the water surface, and are discharged outward from the tank through the gas vent port 52a.

Even if the fine bubbles pass through the first gas separating filter 51, almost all of the fine bubbles are captured by the second gas separating filter 51 and the gas separating filter 52 covering the water outlet 10h, and are separated from the water passing through the filters 51 and 52. That is, most of the fine bubbles which have entered the area 500b without being separated by the first gas separating filter 51 are captured by the second gas separating filter 51 when the water which has entered the area 500b is moved to the area 500c on the lowermost stream side upon passing through the second gas separating filter 51 by the difference in the water pressure. Most of the fine bubbles which have entered the area 500c on the lowermost stream side without being captured by the second gas separating filter 51 are captured by the gas separating filter 52 when the water is sucked out of the outlet 10h. Many of the fine bubbles remaining in each of the areas 500b and 500c are coupled to one another to increase the diameter of the coupled fine bubbles while staying, as described above, thereby producing a buoyant force. The coupled fine bubbles rise to the surface of the water, and are moved toward a gas phase on the water surface. Further, clean water obtained after most of the fine bubbles are separated by being captured by each of the filters 51 and 52 is returned to the pool 2 through the valve B5, the circulating pump P2, and the check valve B6.

Figure 16:
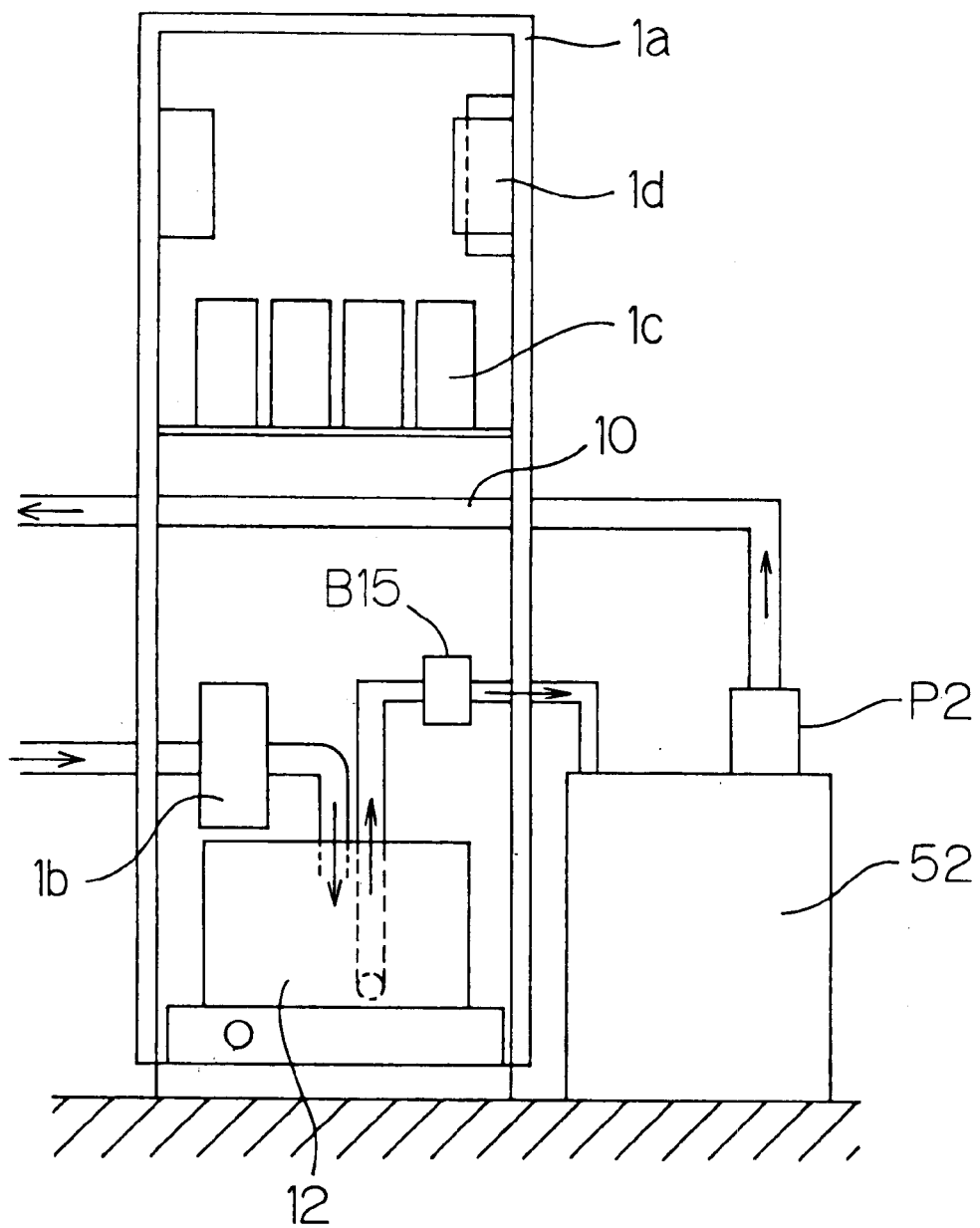
FIG. 16 is a front view of a unit in which the device shown in FIG. 14 is arranged in a cabinet, which illustrates a state where a panel on a front surface of the cabinet is removed such that the internal structure can be seen.

FIG. 16 is a diagram showing the appearance of the water treatment device shown in FIG. 14 which is formed as a unit in a cabinet 1a.

A filter 1b containing a filter 13 and an ion exchange resin 14, the electrolytic tank1 12, a power supply device 1c, a microcomputer (a sequencer) 1d, and a pan 1f, and so forth are arranged in the cabinet 1a. The gas/liquid separating tank 50 and the circulating pump P2 are arranged adjacent to the cabinet 1a and outside thereof, and the members are connected to one another by the water treating path 10.

Figure 17:
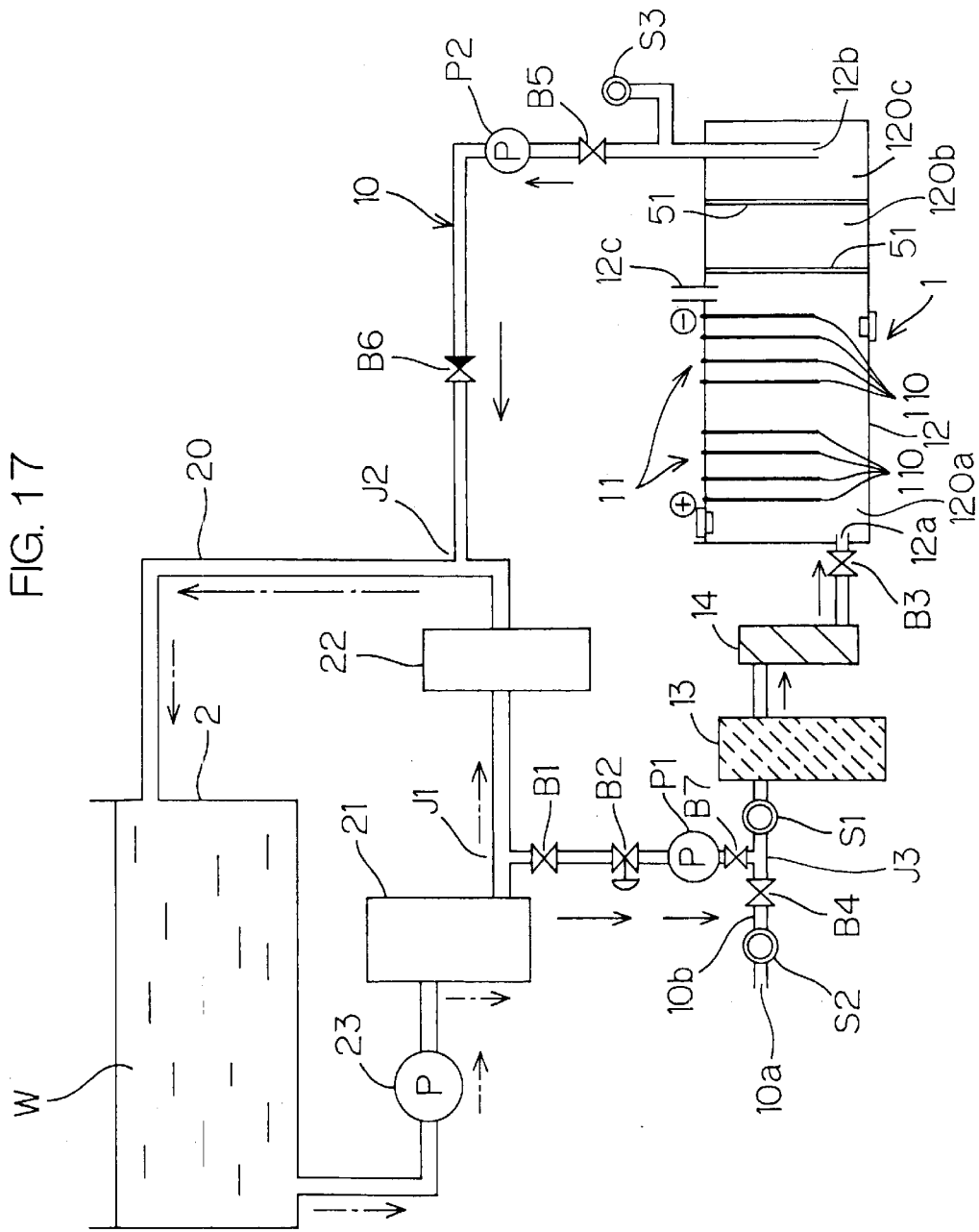
FIG. 17 is a diagram showing the construction of a water treatment device for a large-sized pool according to another embodiment of the present invention.

FIG. 17 is a diagram showing the construction of a water treatment device 1 for a large-sized pool 2 according to another embodiment of the present invention. The construction shown in FIG. 17 differs from the construction shown in FIG. 14 in that a gas separating filter 51 is arranged in an electrolytic tank 12, and the electrolytic tank 12 also serves as a gas/liquid separating tank, described above. Specifically, two plate-shaped gas separating filters 51 are provided, to divide the electrolytic tank 12 into three areas 120a to 120c from the upstream side to the downstream side of the flow of water. In the area 120a on the uppermost stream side of the electrolytic tank 12, a pair of electrodes 11 comprising a plurality of electrodes 110 is arranged, and an inlet 12a into which water flows from a water treating path 10 is provided. A gas vent port 12c for discharging separated gas outward from the tank is formed at a position, corresponding to the area 120a, of a top plate of the electrolytic tank 12. In the area 120c on the lowermost stream side of the electrolytic tank 12, an outlet 12b for causing water to flow out into the water treating path 10 from the tank is provided. The same members as those shown in FIG. 14 are assigned the same reference characters.

The water which has reached the electrolytic tank 12 upon flowing through the water treating path 10 is poured into the area 120a on the uppermost stream side from the inlet 12a. The poured water is sterilized by electrolytic reaction by being caused to flow into the pair of electrodes 11, as required. In this case, a large part of gas generated by the electrolytic reaction is bubbles having a large diameter. Accordingly, the bubbles rise the surface of the water, are moved to a gas phase on the water surface, and are discharged outward from the tank through the gas vent port 12c. When the water is moved to the subsequent area 120b by a difference between pressure at which the water is poured by a circulating pump P1 on the upstream side and negative pressure at which the water is sucked out by a circulating pump P2 on the downstream side, most of fine bubbles included into the water without rising to the water surface are captured by the first gas separating filter 51 to stay in the area 120. Many of the fine bubbles are coupled to one another to increase the diameter of the coupled fine bubbles, thereby producing a buoyant force. The coupled fine bubbles rise to the surface of the water, are then moved toward a gas phase on the water surface, and are discharged outward from the tank through the gas vent port 12c. Even if the fine bubbles pass through the first gas separating filter 51, almost all of the fine bubbles are captured by the second gas separating filter 51. Many of the fine bubbles remaining in the area 120b are coupled to one another to increase the diameter of the coupled fine bubbles while staying, as described above, thereby producing a buoyant force. The coupled fine bubbles rise to the surface of the water, and are moved toward a gas phase on the water surface. Clean water obtained after most of the fine bubbles are separated by being captured by the two gas separating filters 51 is returned to the pool 2 through the valve B5, the circulating pump P2, and the check valve B6.

Figure 18:
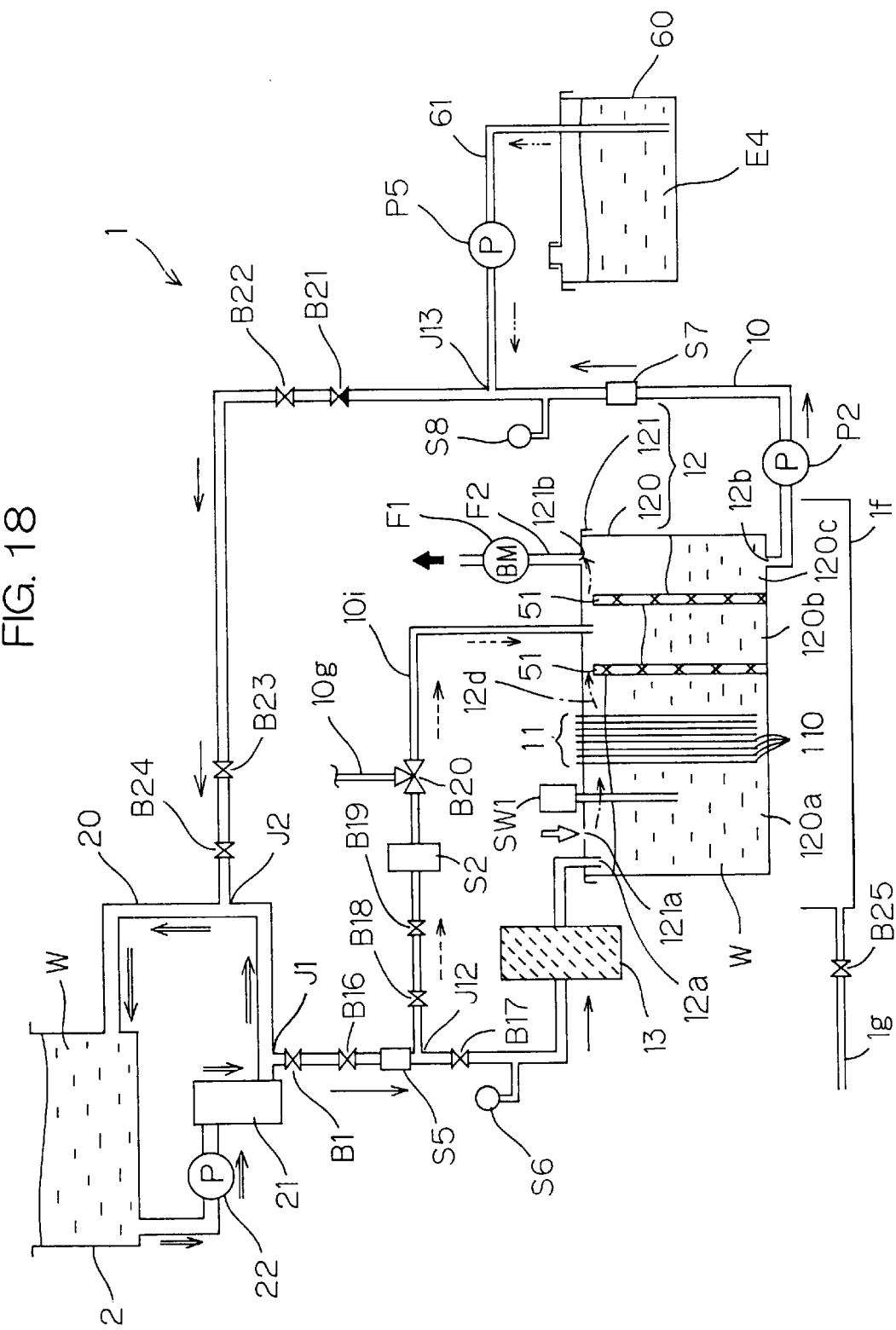
FIG. 18 is a diagram showing the construction of a water treatment device for a large-sized pool according to another embodiment of the present invention.

FIG. 18 is a diagram showing the construction of a water treatment device 1 for a large-sized pool 2 according to another embodiment of the present invention. The construction shown in FIG. 18 differs from the construction shown in FIG. 17 in that there is provided a blower F1 of a suction type for exhausting separated gas outward from an electrolytic tank.

The water treatment device 1 in the present embodiment comprises a water treating path 10 connected to a main circulating path 20. A valve B1, an adjusting valve B16 for flow rate adjustment, a flow meter S5, a valve B17, and a filter 13 for filtration are arranged halfway from a first branching point J1 to an electrolytic tank 12 on a water treating path 10. A pair of electrodes 11 comprising a plurality of plate-shaped electrodes 110 is arranged in the electrolytic tank 12.

A branching path 10i branched at a branching point J12 and leading to the electrolytic tank 12 is connected between the flow meter S5 and the valve B17 on the water treating path 10. A pressure reducing valve B18 for reducing pressure, an adjusting valve B19 for flow rate adjustment, a residual chlorine sensor S2, and a three way valve B20 are arranged on the branching path 10i. A branching path 10j further branched from the branching path 10i and leading to a drain port (not shown) for drawing water is connected to the three way valve B20. The residual chlorine sensor S2 is arranged as described above because a very small quantity of water must be always caused to continuously flow, as described above. That is, the residual chlorine sensor S2 is maintained in a normal state by causing a very small quantity of water to continuously flow through the electrolytic tank 12 via the branching path 10i when the water treatment device 1 is running, while closing the valve B17 as well as switching the three way valve B20 to cause a very small quantity of water to continuously flow into the drain port through the branching path 10j when the running of the water treatment device 1 is stopped.

A pressure gauge S6 for measuring the water pressure is connected between the valve B17 and the filter 13 on the water treating path 10. The pressure gauge S6 and the flow meter S5 are mainly provided in order to prevent, when the water level in the electrolytic tank 12 is abnormally decreased because the supply of the water from the main circulating path 20 to the water treating path 10 is stopped or reduced due to any cause, the members from being damaged by stopping the supply of the water to the pair of electrodes 11 and a circulating pump P2, described later, to stop the running.

The circulating pump P2, a flow meter S7, a check valve B21 for preventing back flow, and adjusting valves B22 and B23 for flow rate adjustment, and a valve B24 are arranged in this order halfway from the electrolytic tank 12 to the branching point J2 on the water treating path 10. A pressure gauge S8 for measuring the water pressure is connected between the flow meter S7 and the check valve B21. The pressure gauge S8 and the flow meter S7 are mainly provided in order to cut off the water treating path 10 from the main circulating path 20 by closing the valves B1 and B24 to prevent the water from overflowing from an air introducing port 121a of the electrolytic tank 12 when the water level in the electrolytic tank 12 is abnormally raised because the reflux of the water from the water treating path 10 to the main circulating path 20 is stopped or reduced due to any cause.

A solution tank 60 to put in and store a sterilizing solution E4 such as a solution of sodium hypochlorite is connected between the pressure gauge S8 and the check valve B21 on the water treating path 10. Specifically, a supplying path 61 is branched from a branching point J13 between the pressure gauge S8 and the check valve B21 on the water treating path 10, to reach the solution tank 60. A fixed delivery pump P5 is interposed halfway on the supplying path 61. The sterilizing solution E4 stored in the solution tank 60 is sucked up through the supplying path 61 by the fixed delivery pump P5, is merged at the branching point J13, and is supplied to the water treating path 10. When the sterilizing solution E4 supplied from the solution tank 60 is used for both electrolytic reaction by the pair of electrodes 11 and sterilization of the water, a time period during which the electrodes 110 are energized is reduced, thereby making it possible to prevent the electrodes 110 from being rapidly exhausted and degraded. Further, it is possible to sufficiently cope with a case where the sterilization must be performed rapidly and in large amounts due to a rapid drop in the residual chlorine concentration of the water when the business hours of a swimming pool of a public bath are started, or the like.

Figure 19:
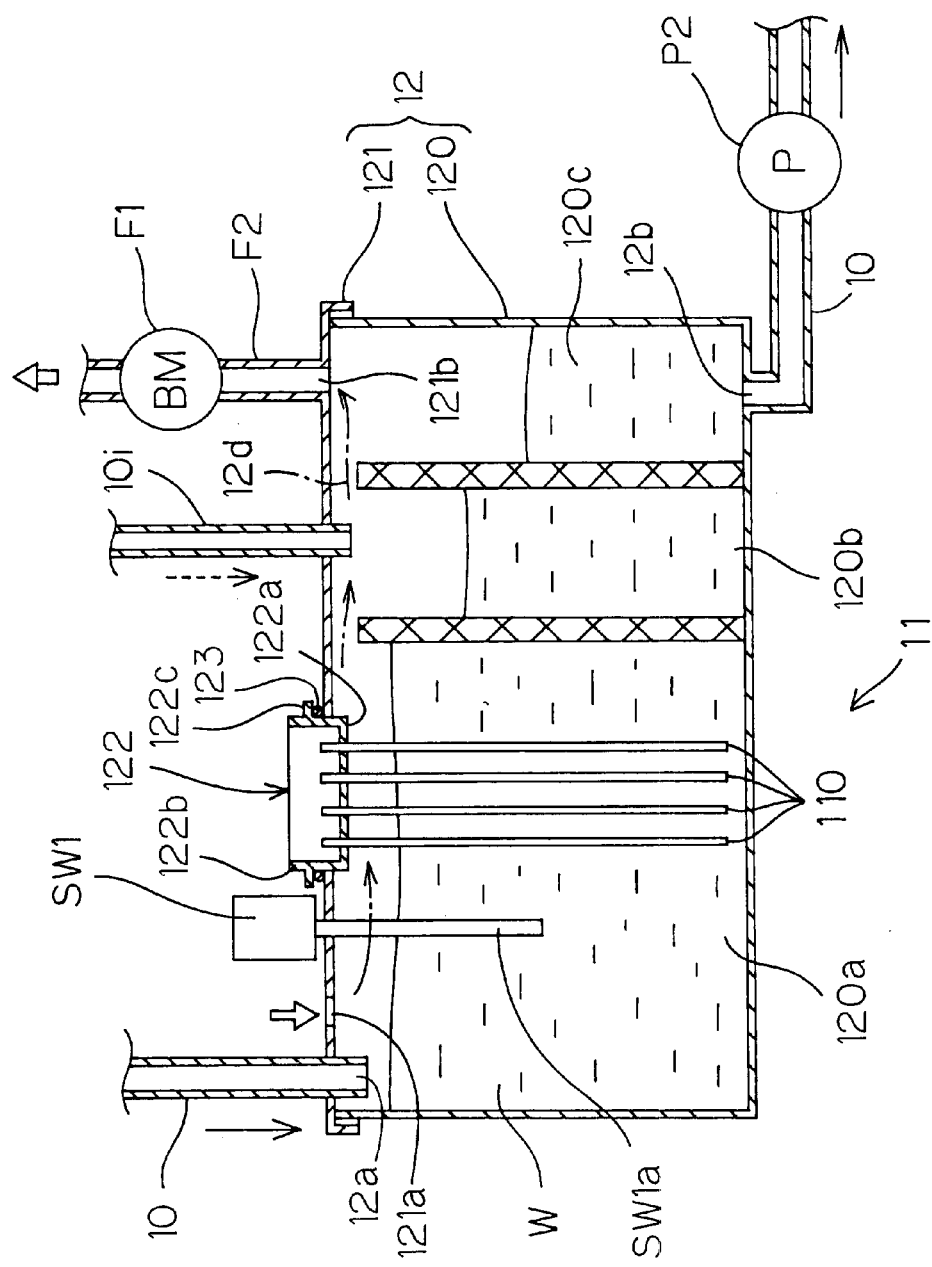
FIG. 19 is a schematic sectional view of an electrolytic tank in the water treatment device shown in FIG. 18.

The electrolytic tank 12 is constituted by a box-shaped body 120 constituting its main body and a cover 121 for closing an upper opening of the body 120 to constitute an upper surface part of the electrolytic tank 12, as also shown in FIG. 19. The body 120 is divided into three areas 120a to 120c by two gas separating filters 51, described above. The pair of electrodes 11 comprising the plurality of electrodes 110 is arranged in the area 120a on the uppermost stream side out of the three areas 120a to 120c. An outlet 12b for causing water to flow out into the water treating path 10 from the tank is provided at the bottom of the area 120c on the lowermost stream side.

Above a water surface of water W in each of the areas 120a to 120c and above the upper side of each of the filters 51 in the electrolytic tank 12, a clearance is formed between the upper side and the cover 121. By the clearance, a gas circulating path 12d leading to each of the areas 120a to 120c is formed, as indicated by an arrow with a chain line, in the electrolytic tank 12.

An exhaust pipe F2 comprising the blower F1 of a suction type for forcedly exhausting gas originated from fine bubbles separated from the water W by the filters 51 outward from the tank is connected to a position, just above the area 120c on the lowermost stream side where the water level is the lowest and consequently, there is a sufficient space on the water surface, as shown in the figures, because of the effect of the resistances of the filters 51 on the flow of water, of the cover 121. The exhaust pipe F2 is opened toward the outside of the tank via the blower F1 from a gas suction port 121b provided on the cover 121.

Figure 20:
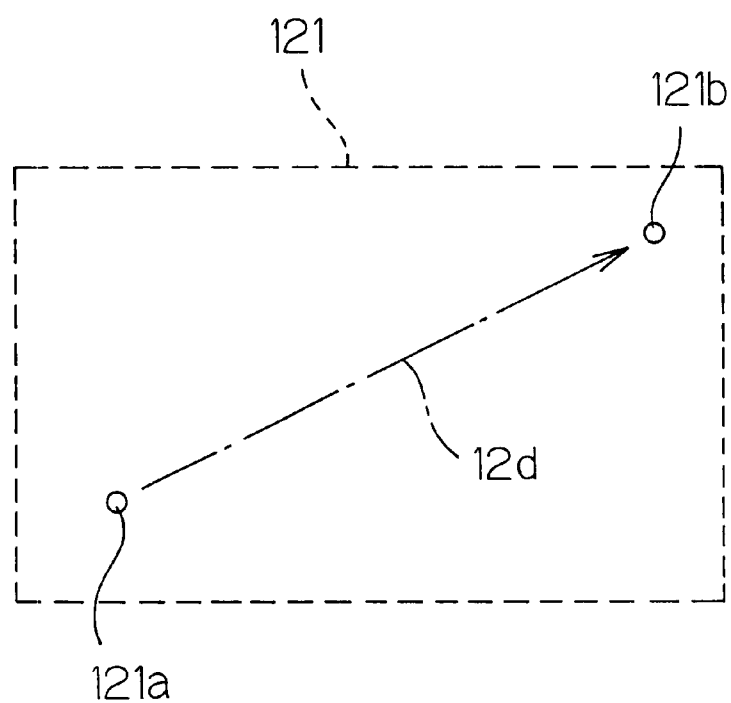
FIG. 20 is a schematic plan view for explaining the arrangement of a gas suction port into a blower and an air introducing port in the electrolytic tank.

The air introducing port 121a for introducing air into the tank, as indicated by a white arrow in FIG. 18, in place of gas exhausted outward from the tank, as indicated by a black arrow in FIG. 18, by the blower F1 is formed at a position, just above the area 120a on the uppermost stream side, of the cover 121. The gas suction port 121b and the air introducing port 121a are arranged at farthest diagonal positions, on the gas circulating path 12d, of the cover 121, as shown in FIG. 20. When the blower F1 is operated, the gas originated from the fine bubbles which are separated from the water W by the filters 51 is efficiently exhausted outward from the tank with the gas carried on the flow of air flowing through the gas circulating path 12d from the air introducing port 121a to the suction port 121b.

An inlet 12a into which water flows from the water treating path 10 is also provided at a position, just above the area 120a, of the cover 121.

A small cover 122 for holding the plurality of electrodes 110 constituting the pair of electrodes 11 is arranged in a state where it can be separated from the cover 121 in order to arrange the pair of electrodes 11 in the area 120a on the uppermost stream side at a position, just above the area 120a, of the cover 121. The small cover 122 comprises a flat plate-shaped bottom plate 122a for holding the plurality of electrodes 110, a rib 122b provided in a protruding condition from a peripheral edge of the bottom plate 122a so as to surround the base of each of the electrodes 110 and projected upward from an upper surface of the cover 121, and a collar 122c provided in a protruding condition outward from a side surface of the rib 122b. In a state where the cover 121 shown in FIG. 19 is mounted, a portion between both the covers 121 and 122 is sealed by a sealing material 123 interposed between a lower surface of the collar 122c and the upper surface of the cover 121 such that water does not leak.

A water level sensor SW1 serving as water level sensing means which is connected to control means (not shown) for controlling the water level in the area 120a in a predetermined range is further arranged at a position, just above the area 120a, of the cover 121 such that its water level sensing portion SW1a is inserted into the area 120a. The control means opens or closes the valve B1 and adjusts the flow rate by the adjusting valve B2 on the basis of data representing the water level of the water W in the area 120a on the uppermost stream side which is sensed by the water level sensing portion SW1a of the water level sensor SW1, to adjust the quantity of water flowing into the electrolytic tank 12. By the adjustment, the water level of the water W in the area 120a is controlled in a predetermined range.

The above-mentioned branching path 10i is connected to a position, just above the area 120b, of the cover 121.

A pan 1f for water which has leaked is arranged below the electrolytic tank 12. Even if water leaks in the electrolytic tank 12, it is possible to miniaturize the danger of short, leakage, or the like due to the water which has leaked. Reference character 1g denotes a drawing path for drawing the water which has leaked, received by the pan if, to a drain port (not shown), and reference character B25 denotes an adjusting valve for adjusting the flow rate of the water passing through the drawing path 1g.

Figure 21:
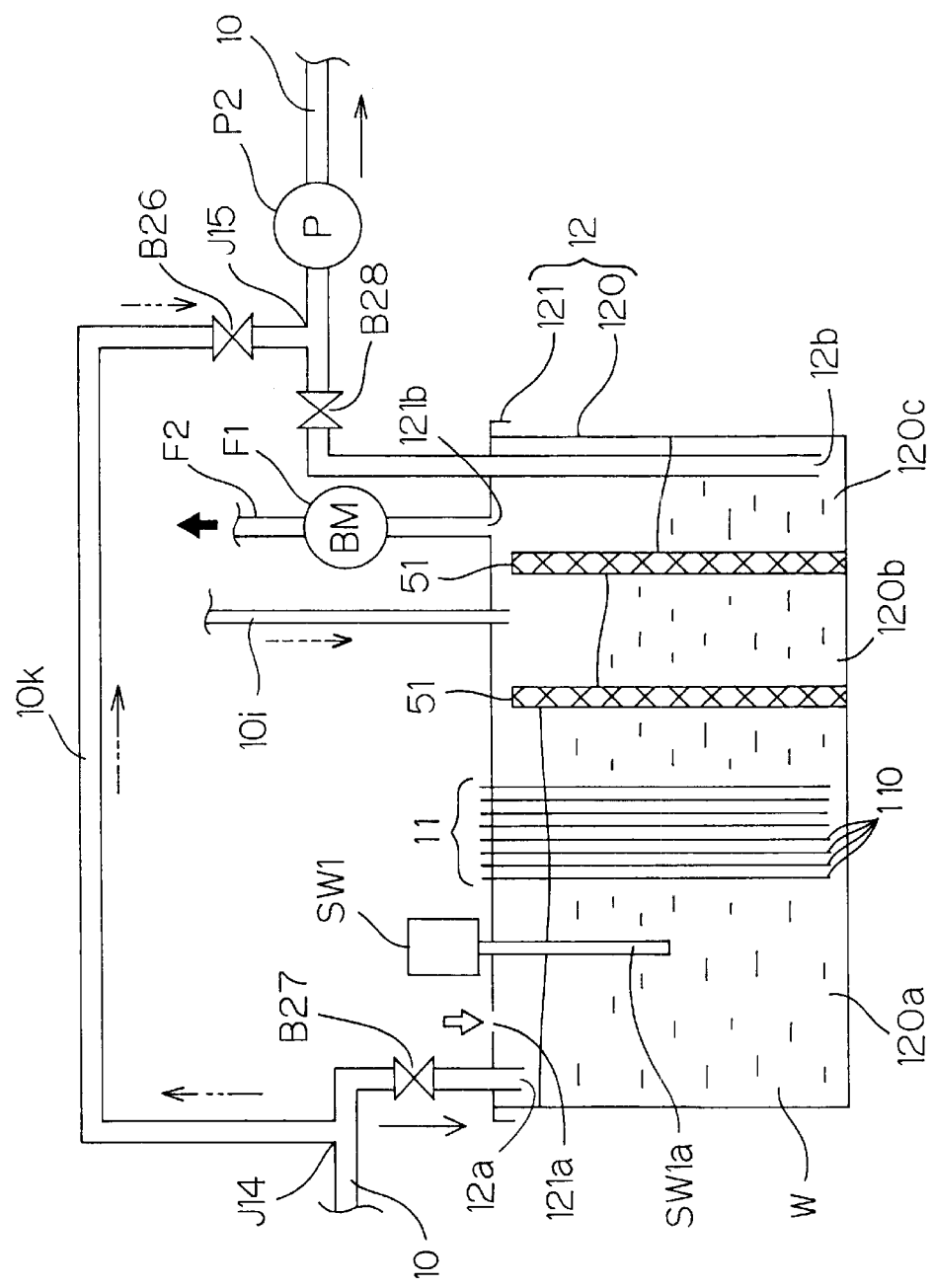
FIG. 21 is a diagram schematically showing a modified example of an electrolytic tank.

FIG. 21 illustrates a modified example of the vicinity of the electrolytic tank 12. In this example, piping, on the side of the water outlet 12b of the electrolytic tank 12, on the water treating path 10 is arranged in a state where it is inserted into the area 120c through the cover 121 from above the electrolytic tank 12 such that the outlet 12b is positioned in the vicinity of the bottom of the area 120c on the lowermost stream side.

In this example, a branching path 10k branched at a branching point J14 provided on the upstream side of the electrolytic tank 12 on the water treating path 10 for supplying to the circulating pump P2 priming required when the circulating pump P2 is started is provided. Specifically, the branching path 10k is branched at the branching point J14, and is merged into the water treating path 10 at a branching point J15 between the electrolytic tank 12 and the circulating pump P2 through a valve B26. A valve B27 is provided between the branching point J14 and the electrolytic tank 12 on the water treating path 10. Further, a valve B28 is provided between the electrolytic tank 12 and the branching point J15 on the water treating path 10. The same members as those shown in FIG. 19 are assigned the same reference characters.

In order to smoothly start the operation of the circulating pump P2 in the above-mentioned construction, it is necessary to incorporate a circulating pump P2 which differs in specification depending on whether or not the upstream side of the water treating path 10 has a structure in which water pressure from the main circulating path 20 is applied.

Specifically, when pressure from the main circulating path 20 is applied on the upstream side of the water treating path 10, a normal pump is used as the circulating pump P2. The valves B27 and the B28 are closed, and the opening or closing valve B26 is opened. Consequently, priming is automatically supplied to the circulating pump P2 through the branching path 10k by the pressure from the main circulating path 20. Accordingly, the circulating pump 20 enters a state where it can be started without being damaged.

When no pressure is applied to the upstream side of the water treating path 10, so that water is not automatically supplied through the branching path 10k even if the valve B26 is opened, used as the circulating pump P2 is one of a self-contained type. The circulating pump P2 of a self-contained type has the function of supplying water serving as priming for itself by a suction force at the time of operating the pump. Accordingly, the circulating pump P2 is in a state where it can be started without being damaged at any time.

The circulating pump P2 is then started in this state. Consequently, the water is continuously supplied through the branching path 10k, so that the operation of the circulating pump P2 is stabilized. Therefore, the opening or closing valve B27 is opened, to start to supply the water to the electrolytic tank 12. The water flows into the area 120c on the lowermost stream side through the filters 51. When the valve B28 is opened at the time point where the water outlet 12b on the water treating path 10 is immersed in the water, a second half part of the water treating path 10 is filled with the water from the area 120c by a suction force of the circulating pump P2. Consequently, the circulating pump P2 enters a state where a normal operation can be performed. Accordingly, the circulating pump P2 proceeds to a normal operating state by closing the valve B26.

Figure 22:
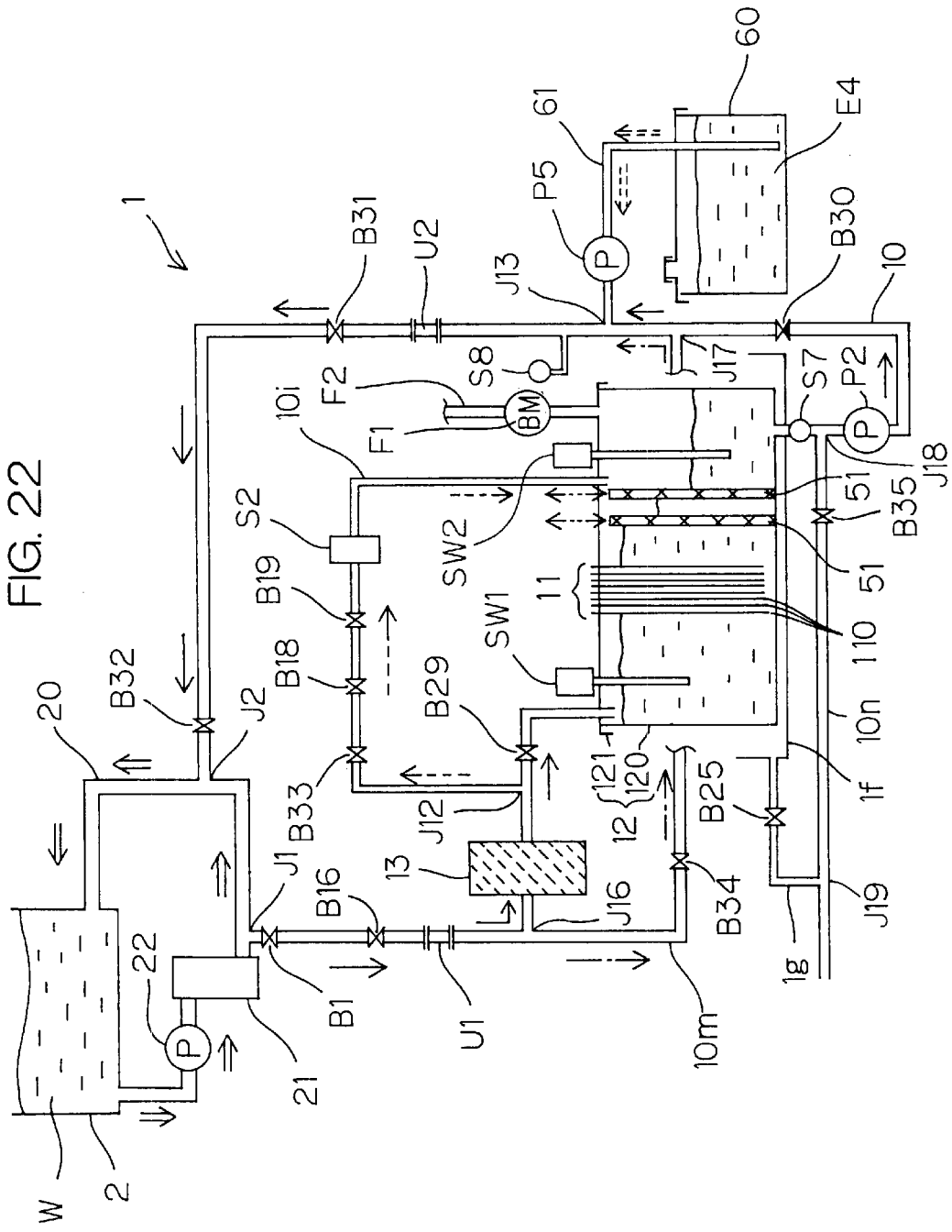
FIG. 22 is a diagram showing the construction of a water treatment device for a large-sized pool according to another embodiment of the present invention.

FIG. 22 is a diagram showing the construction of a water treatment device 1 for a large-sized pool 2 according to another embodiment of the present invention. A principal difference of the construction shown in FIG. 22 from the construction shown in FIG. 18 is that gas separating filters 51 are made detachable from an electrolytic tank 12.

The water treatment device 1 in the present embodiment comprises a water treating path 10 connected to a main circulating path 20. A valve B1, an adjusting valve B16 for flow rate adjustment, a filter 13 for filtration, and a valve B29 are arranged halfway from a first branching point J1 to the electrolytic tank 12 on the water treating path 10. Further, a flow meter S7 for measuring the flow rate of water delivered form the electrolytic tank 12, a circulating pump P2, a check valve B30, an adjusting valve B31 for flow rate adjustment, and a valve B32 are arranged in this order halfway from the electrolytic tank 12 to a branching point J2. Each of the valves B31 and B32 is for cutting off a space between the valve and the main circulating path 20 at the time of work such as location or maintenance of the water treatment device 1. In order to perform the work with good workability without causing the pressure loss of the main circulating path 20 and the suction of air by the circulating pump P2, or the like, the valves B31 and B32 are arranged at positions which are as close to the branching point J1 and the branching point J2 as possible on the water treating path 10.

A branching path 10$i$ branched at a branching point J12, connected to a residual chlorine sensor S2 through a valve B33, a pressure reducing valve B18, and an adjusting valve B19, and leading to the electrolytic tank 12 is provided between the filter 13 and the valve B29 on the water treating path 10. The reason for this is as follows.

A connecting section U1 is provided between the adjusting valve B16 and the filter 13 on the water treating path 10. A flow meter for measuring, when the flow rate of water flowing through a portion, on the upstream side from the branching point J1 to the electrolytic tank 12, of the water treating path 10 is adjusted by the adjusting valve B16 at the time of locating or maintaining, or the like, the device 1, the flow rate is connected to the connecting section U1 so as to be attachable or detachable. Further, a connecting section U2 is similarly provided between the check valve B30 and the adjusting valve B31 on the water treating path 10. A flow meter for measuring, when the flow rate of water flowing through a portion, on the downstream side from the electrolytic tank 12 to the branching point J2, of the water treating path 10 is adjusted by the adjusting valve B31, the flow rate is connected to the connecting section U2 so as to be attachable or detachable. Both the connecting sections U1 and U2 are constructed by arranging a pair of unions halfway on piping constituting the water treating path 10, or the like, and making the piping therebetween attachable or detachable. The water treatment device 1 is operated in a state where the piping between the unions is replaced with piping to which the flow meter is connected, to adjust the flow rate by the adjusting valves B16 and B31. The device 1 is then stopped, and the valves B1 and B32 are closed to stop the flow of water. Thereafter, the flow meter is detached from the piping, and normal piping is connected instead, thereby bringing the device 1 into a normal running state.

A solution tank 60 to put in and store a sterilizing solution E4 such as a solution of sodium hypochlorite, or the like, is connected between the check valve B30 and the connecting section U2 on the water treating path 10. Specifically, a supplying path 61 is branched from a branching point J13 between the check valve B30 and the connecting section U2 on the water treating path 10, to reach the solution tank 60. A fixed delivery pump P5 is interposed halfway on the supplying path 61. The sterilizing solution E4 stored in the solution tank 60 is sucked up through the supplying path 61 by the fixed delivery pump P5, and is merged at the branching point J13, and is supplied to the water treating path 10.

A bypass path 10$m$ branched at a branching point J5 and leading to a branching point J17 between the check valve B30 and the branching point J13 through a valve B34 is connected between the connecting section U1 and the filter 13 on the water treating path 10. The valve B29 is closed and the valve B34 is opened when a pair of electrodes 11 is maintained or develops a fault, or when the residual chlorine concentration is rapidly lowered, or the like, to supply the sterilizing solution E4 to water from the solution tank 60 to sterilize the water while circulating the water through the bypass path 10$m$ having a low pressure loss. The switching may be performed by hand. Alternatively, the latter switching at the time of the rapid drop in the residual chlorine concentration may be automatically performed on the basis of the measured value of the residual chlorine concentration by the residual chlorine sensor S2.

A pressure gauge S8 for measuring water pressure is connected between the branching point J13 and the connecting section U2.

A pan 1$f$ for water which has leaked is arranged below the electrolytic tank 12. The water received by the pan 1$f$ is fed to a drain port (not shown) through a draining path 1$g$. Reference character B25 denotes an adjusting valve for flow rate adjustment. A branching path 10$n$ branched at a branching point J18 and merged into the draining path 1$g$ at a branching point J19 through a valve B35 is provided between the flow meter S7 and the circulating pump P2 on the water treating path 10. The branching path 10$n$ is for opening the valve B35 at the time of maintenance, or the like, to extract the water remaining in the electrolytic tank 12 and the water treating path 10, and feed the water to the drain port.

Figure 23:
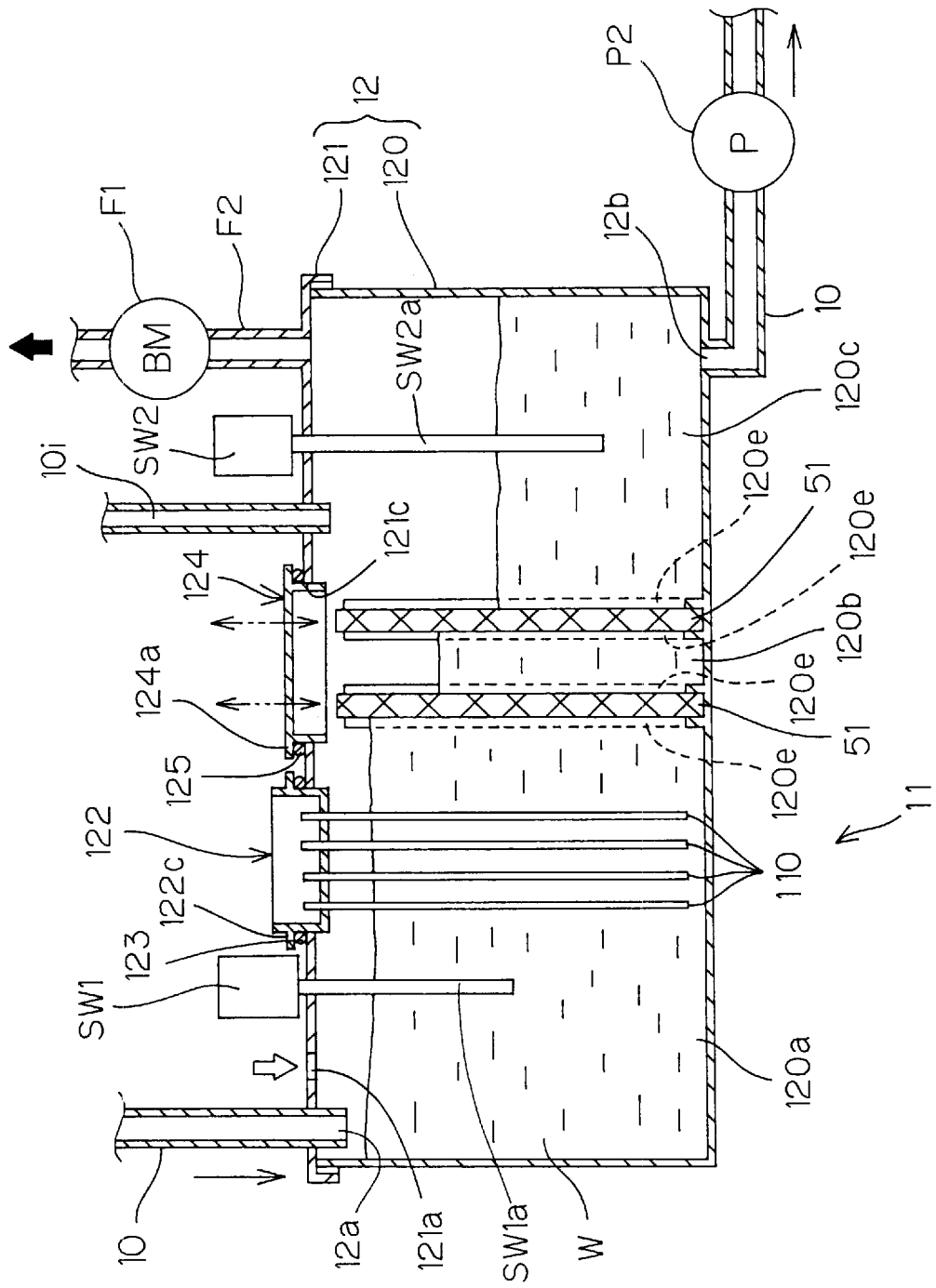
FIG. 23 is a schematic sectional view of an electrolytic tank in the water treatment device shown in FIG. 22.
Figure 24:
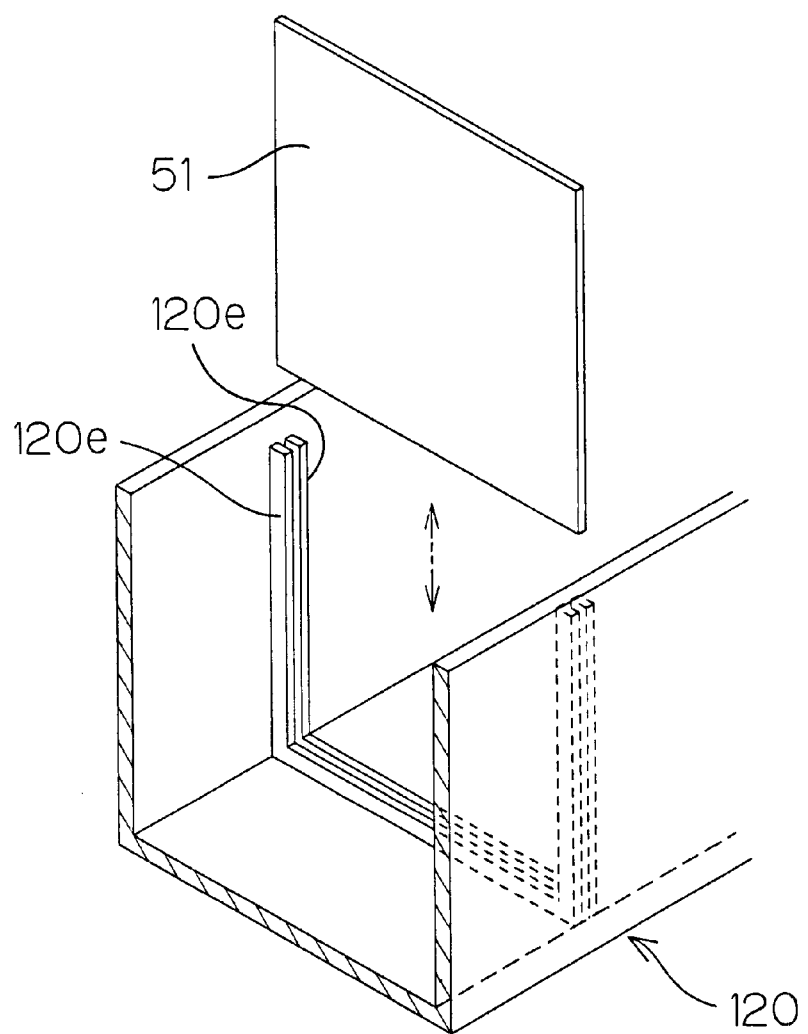
FIG. 24 is a partially cutaway view in perspective showing a structure in which a gas separating filter is attached or detached to or from the body of the electrolytic tank shown in FIG. 23.

Although the electrolytic tank 12 is basically constructed as in FIG. 19, the filters 51 is made detachable from a body 120 of the electrolytic tank 12, as shown in FIGS. 23 and 24. Specifically, a peripheral edge of the filter 51 formed in a plate shape is made extractable and insertable from above between two projections 120$e$ formed on an inner wall surface and a bottom surface of the body 120. Further, an opening 121$c$ is formed at a position, corresponding to the filter 51, of a cover 121. The opening 121$c$ is generally closed by a small cover 124. Further, the small cover 124 and the cover 121 are sealed by a sealing member 125 interposed between a flange 124$a$ of the small cover 124 and an upper surface of the cover 121 such that water and gas do not leak.

In the example as shown, a water level sensor SW2 serving as water level sensing means is also arranged such that its water level sensing portion SW2$a$ is inserted into an area 120$c$ at a position, just above the area 120$c$, of the cover 121 in addition to a water level sensor SW1 arranged at a position, just above the area 120$a$, of the cover 121. The same members as those shown in FIG. 19 are assigned the same reference characters.

Figure 25:
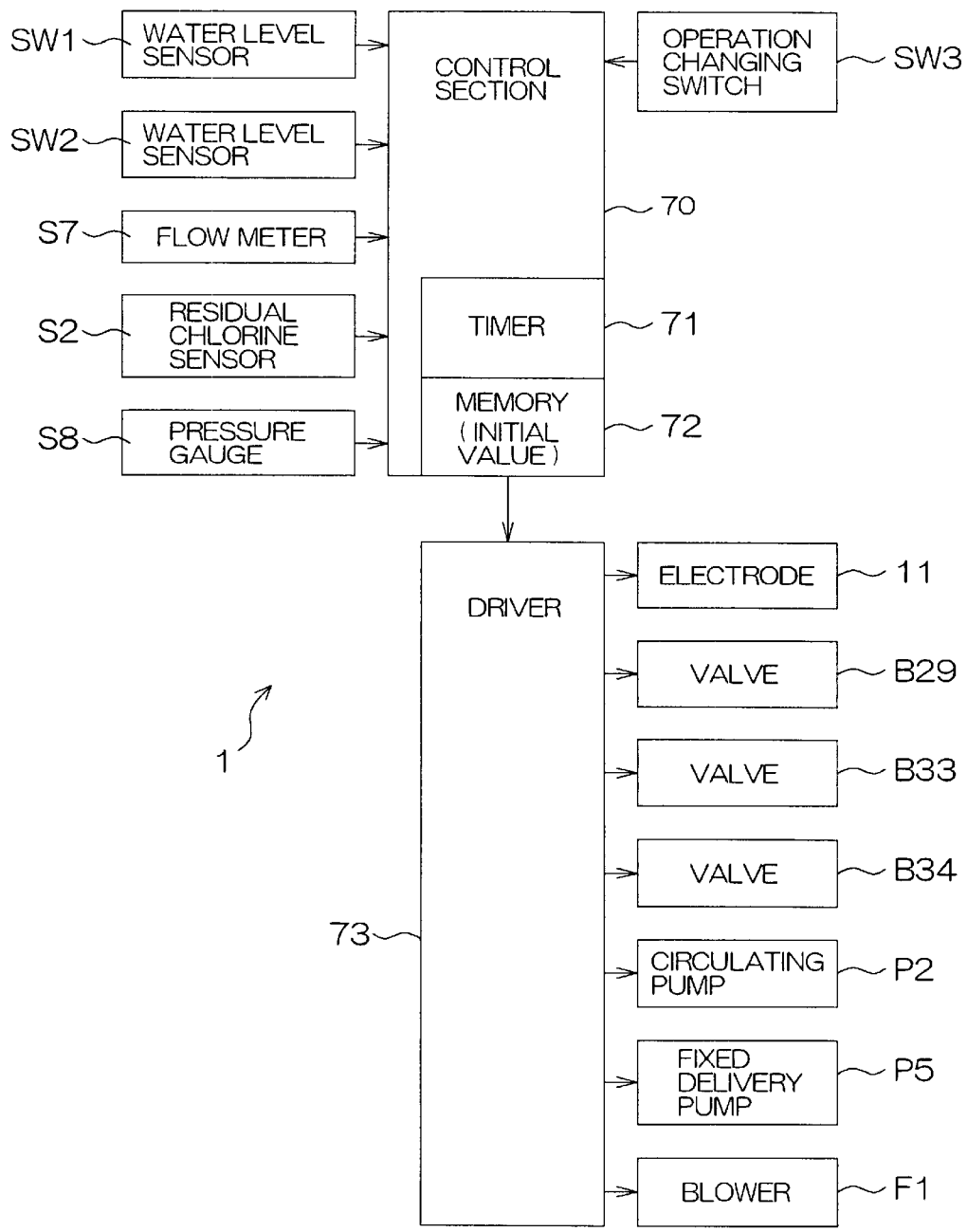
FIG. 25 is a block diagram showing the electrical configuration of the water treating device shown in FIG. 22.

FIG. 25 is a block diagram showing the electrical configuration of the water treatment device 1 shown in FIG. 22.

As shown in FIG. 25, the water treatment device 1 comprises a control section 70 serving as control means for operating each of sections constituting the water treating path 10, the bypass path 10$m$, the supplying path 61, and so forth while controlling the energization of the pair of electrodes 11.

Outputs of the water level sensors SW1 and SW2, the flow meter S7, the residual chlorine sensor S2, and the pressure gauge S8 are fed to the control section 70. The control section 70 comprises a timer 71 for defining the timing of each type of operation and a memory 72 for registering initial values of the quantity of water stored in the pool 2 and the reference chlorine concentration of the water, or the like.

The control section 70 performs various types of operations on the basis of the outputs of the sensors, and the timing defined by the timer 71, and the initial values registered in the memory 72, and feeds a control signal to the driver 73 on the basis of the operations. The driver 73 controls energization, for example, electrical current flowing through the pair of electrodes 11 and a time period during which the pair of electrodes 11 is energized on the basis of the fed signal, and controls the opening or closing of the valves B29, B33, and B34 and the driving of the pumps P2 and P5, and the blower F1.

In FIG. 25, reference character SW3 denotes an automatic/manual changing switch for switching an automatic operation using the control section 70 and a manual operation for forcedly energizing the pair of electrodes 11 and operating the water treating path 10 or the like irrespective of an output signal from each of the types of sensors.

Figure 26:
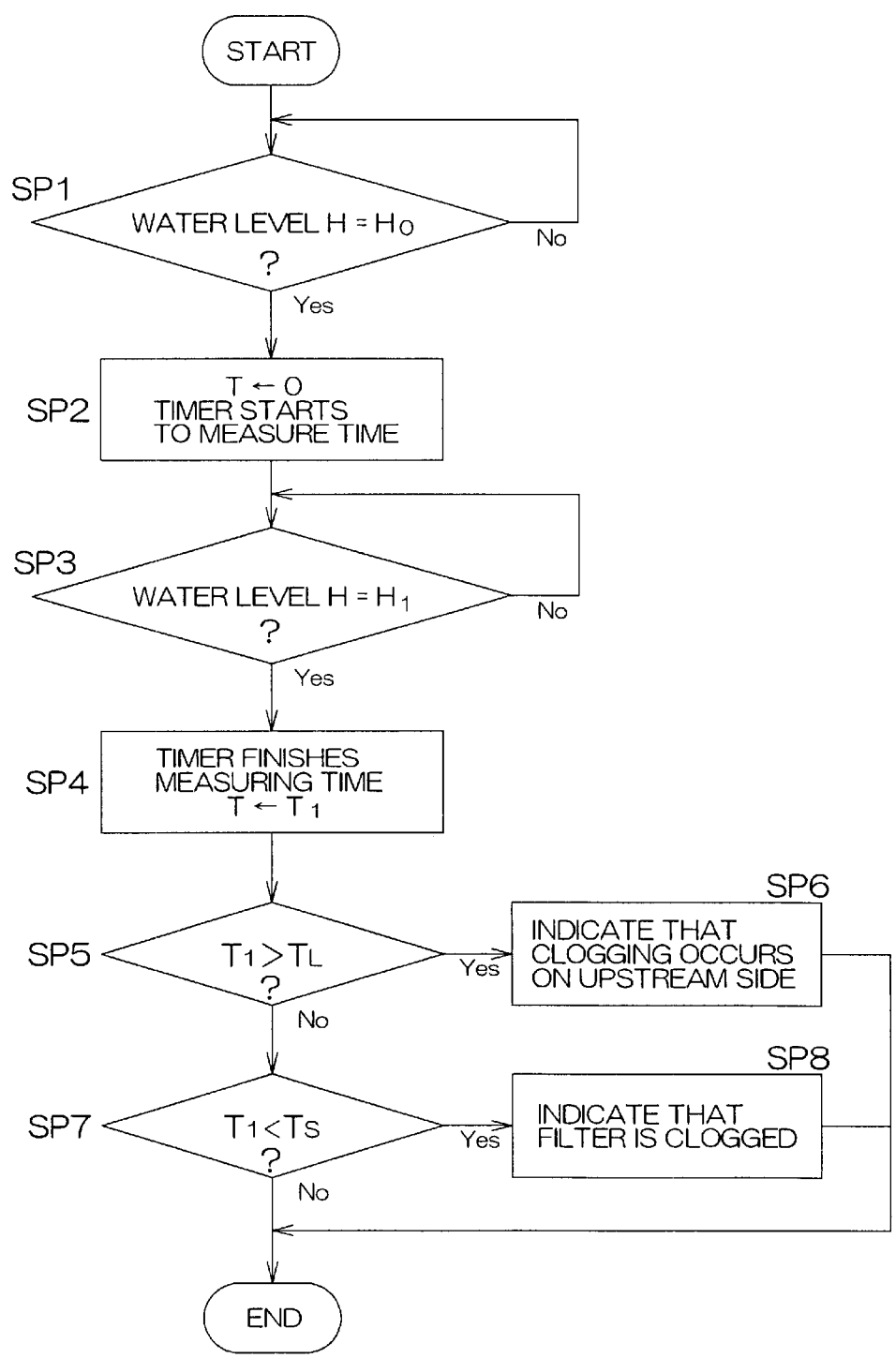
FIG. 26 is a flow chart showing the flow of a clogging sensing operation using a water level sensor in the contents of control carried out by a control section.

FIG. 26 is a flow chart showing the flow of clogging sensing using the water level sensor SW1 in the control carried out by the control section 70.

When the power of the water treatment device 1 is turned on, and each of the sections constituting the water treating path 10 is operated, so that water flows into the area 120a on the uppermost stream side of the electrolytic tank 12, the control section 70 confirms whether or not the water level in the area 120a reaches a predetermined water level Ho in the sensing range of the water level sensor SW1 (step SP1).

The timer 71 is then reset (T←0) at the time point where the water level reaches $H_0$ to start to measure time (step SP2), and a time period $T_1$ required until the water level reaches $H_1$ is found (step SP3 to SP4).

The time period $T_1$ is previously compared with a threshold previously recorded on the memory 72, to judge that a portion on the upstream side of the electrolytic tank 12 is clogged when the time period $T_1$ is more than an upper-limit threshold $T_L$ ($T_1 > T_L$), to indicate that clogging occurs (steps SP5 to SP6).

On the other hand, when the time period $T_1$ is less than a lower-limit threshold $T_S$ ($T_1 < T_S$), it is judged that either one of the gas separating filters 51 in the electrolytic tank 12 is clogged, to indicate that clogging occurs (steps SP7 to SP8).

Furthermore, when the time period $T_1$ is within a range of both the thresholds $T_L$ and $T_S$ ($T_S \leq T_1 \leq T_L$), it is judged that no portion is clogged (step SP7), to indicate nothing. The control of the clogging sensing is thus terminated.

Figure 27:
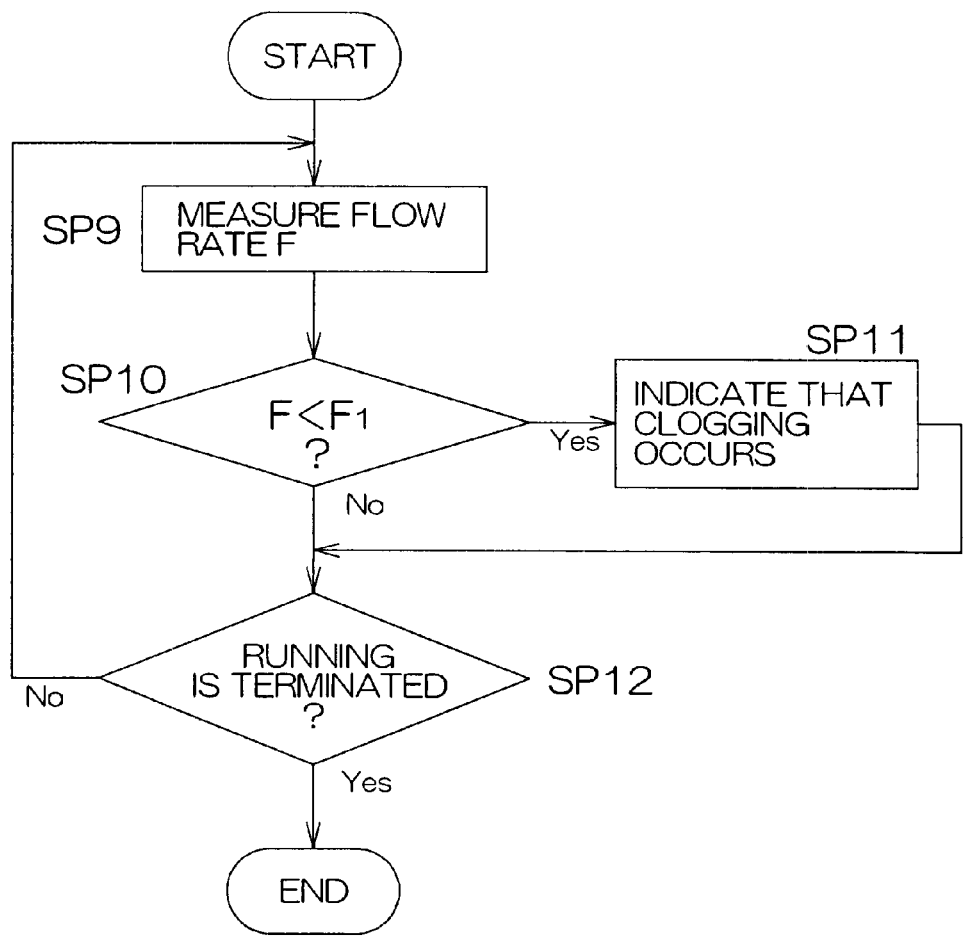
FIG. 27 is a flow chart showing the flow of a clogging sensing operation using a flow meter in the contents of control carried out by a control section.

FIG. 27 is a flow chart showing the flow of clogging sensing using the flow meter S7 in the control carried out by the control section 70.

When the power of the water treatment device 1 is turned on, and each of the sections constituting the water treating path 10 is operated, so that water starts to be circulated in the water treating path 10, the control section 70 measures the flow rate F of the water by the flow meter S7 (step SP9).

The flow rate F is compared with a threshold $F_1$ previously recorded on the memory 72. When the measured flow rate F is less than the threshold $F_1$ ($F < F_1$), it is judged that either one of the gas separating filters 51 in the electrolytic tank 12 or the portion on the upstream side of the electrolytic tank 12 is clogged, to indicate that clogging occurs (steps SP10 to SP11).

On the other hand, when the measured flow rate F is not less than the threshold $F_1$ ($F \geq F_1$), nothing is indicated, to continue the sensing until the running of the device 1 is terminated (steps SP10 and SP12).

Figure 28:
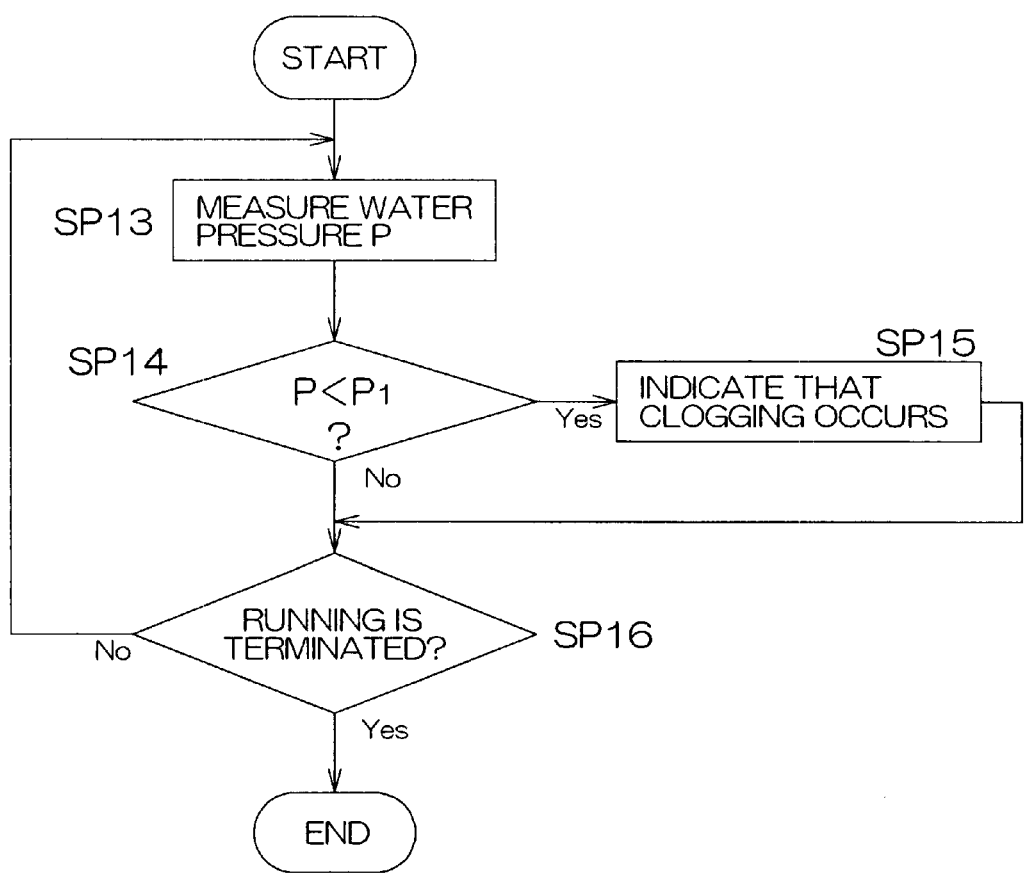
FIG. 28 is a flow chart showing the flow of a clogging sensing operation using a pressure gauge in the contents of control carried out by a control section.

FIG. 28 is a flow chart showing the flow of clogging sensing using the pressure gauge S8 in the control carried out by the control section 70.

When the power of the water treatment device 1 is turned on, and each of the sections constituting the water treating path 10 is operated, so that water starts to be circulated in the water treating path 10, the control section 70 measures the water pressure of the water by the pressure gauge S8 (step SP13).

The water pressure is compared with a threshold $P_1$ previously recorded on the memory 72. When the measured water pressure P is less than the threshold $P_1$ ($P < P_1$), it is judged that either one of the gas separating filters 51 in the electrolytic tank 12 or the portion on the upstream side of the electrolytic tank 12 is clogged, to indicate that clogging occurs (steps SP14 to SP15).

On the other hand, when the measured water pressure P is not less than the threshold $P_1$ ($P \geq P_1$), nothing is indicated, to continue the sensing until the running of the device 1 is terminated (steps SP14 and SP16).

Either one of the types of clogging sensing, described above, shown in FIGS. 26 to 28 may be performed. Alternatively, two or more types of clogging sensing may be simultaneously performed for safety.

Figure 29:
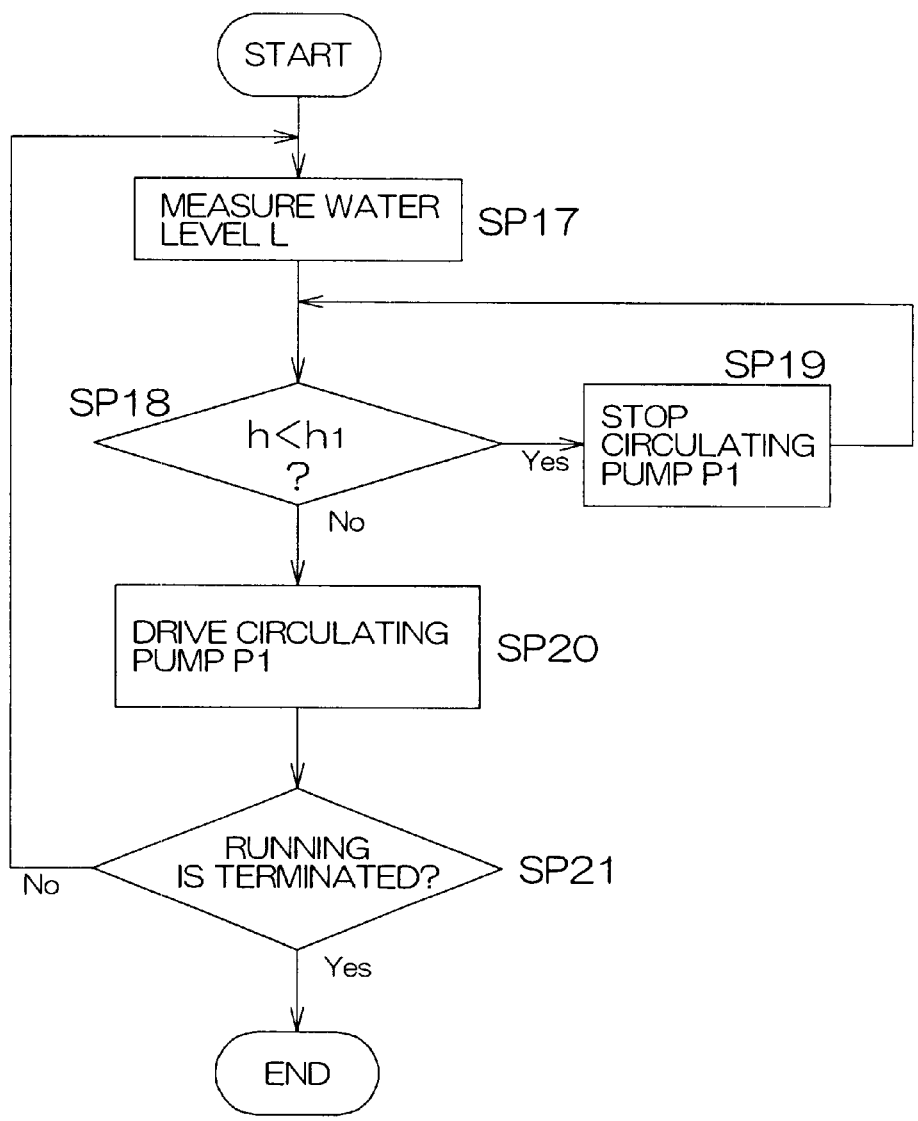
FIG. 29 is a flow chart showing the flow of an air suction preventing operation using a water level sensor in the contents of control carried out by a control section.

FIG. 29 is a flow chart showing the flow of prevention of the suction of air by the circulating pump P2 using a water level sensor SW2 in the control carried out by the control section 70.

When the power of the water treatment device 1 is turned on, and each of the sections constituting the water treating path 10 is operated, so that water starts to be circulated in the water treating path 10, the control section 70 measures the water level h of the water in the area 120c on the lowermost stream side of the electrolytic tank 12 by the water level sensor SW2 (step SP18).

The measured water level h is then compared with a threshold $h_1$ previously recorded on the memory 72. When the measured water level h is less than the threshold $h_1$ ($h < h_1$), it is judged that the circulating pump P2 may suck air, to stop the circulating pump P2 (steps SP19)

At the time point where the measured water level h is not less than the threshold $h_1$ (h>h1), the driving of the circulating pump P2 is resumed (step SP20), to continue the above-mentioned series of operations until the running of the device 1 is terminated (step SP21)

Although the present invention has been described and illustrated in detail, it is clearly understood that the same is by way of illustration and example only and is not to be taken by way of limitation, the spirit and scope of the present invention being limited only by the terms of the appended claims.

The disclosure of Japanese patent application Nos. 11-357937, 11-357938, 11-359355, 2000-30901 and 2000-101128, filed Dec. 16, 1999, Dec. 16, 1999, Dec. 17, 1999, Feb. 8, 2000 and Apr. 3, 2000, respectively, is incorporated herewith by reference.

What is claimed is:

1. A water treatment device comprising:
   electrolyzing and sterilizing means, comprising an electrolytic tank to put water in and an electrode for electrolysis provided in the electrolytic tank, for pouring water into the electrolytic tank, energizing the electrode, and electrolyzing the water, to sterilize the water;
   a water treatment path connected to a pool storing water for pouring the water in the pool into the electrolytic tank and returning to the pool the water in the electrolytic tank; and
   a gas separating filter arranged in the electrolytic tank in order to separate from the water gas generated by the electrolysis.

2. The water treatment device according to claim 1, wherein
   the electrolytic tank comprises a blower of a suction type for exhausting the separated gas outward from the electrolytic tank.

3. The water treatment device according to claim 1, further comprising
   a circulating pump provided on the downstream side of the electrolytic tank on the water treatment path in order to suck the water out of the electrolytic tank and circulate the water.

4. The water treatment device according to claim 1, wherein the gas separating filter is formed in a plate shape, the electrolytic tank is divided into three or more areas by providing two or more plate-shaped gas separating filters, and the electrode is arranged in the area, on the uppermost stream side, obtained by the division.

5. The water treatment device according to claim 4, further comprising water level sensing means for sensing the water level in the area on the uppermost stream side in the electrolytic tank, and control means for controlling the pouring of the water into the electrolytic tank on the basis of an output of the water level sensing means.

6. The water treatment device according to claim 4, wherein the gas separating filter is detachable from the electrolytic tank.

* * * * *